(12) United States Patent
Kjallstrom et al.

(10) Patent No.: US 9,685,005 B2
(45) Date of Patent: Jun. 20, 2017

(54) VIRTUAL LASERS FOR INTERACTING WITH AUGMENTED REALITY ENVIRONMENTS

(71) Applicant: EON REALITY, INC., Irvine, CA (US)

(72) Inventors: Jan Kjallstrom, Monarch Beach, CA (US); Erbo Li, Lake Forest, CA (US); Yazhou Huang, Mission Viejo, CA (US)

(73) Assignee: EON REALITY, INC., Irvine, CA (US)

( * ) Notice: Subject to any disclaimer, the term of this patent is extended or adjusted under 35 U.S.C. 154(b) by 0 days.

(21) Appl. No.: 14/588,789

(22) Filed: Jan. 2, 2015

(65) Prior Publication Data
US 2016/0196692 A1    Jul. 7, 2016

(51) Int. Cl.
| | |
|---|---|
| *G09G 5/00* | (2006.01) |
| *G06T 19/00* | (2011.01) |
| *G06K 9/46* | (2006.01) |
| *G06K 9/52* | (2006.01) |
| *G06F 3/0346* | (2013.01) |
| *G06F 1/16* | (2006.01) |

(Continued)

(52) U.S. Cl.
CPC .......... *G06T 19/006* (2013.01); *G06F 1/1694* (2013.01); *G06F 3/011* (2013.01); *G06F 3/0346* (2013.01); *G06F 3/04815* (2013.01); *G06K 9/46* (2013.01); *G06K 9/52* (2013.01); *G06K 2009/4666* (2013.01)

(58) Field of Classification Search
CPC ....... G06T 19/006; G06T 19/00; G06F 3/011; G06F 3/012; G02B 27/017

USPC ........................................................ 345/633
See application file for complete search history.

(56) References Cited

U.S. PATENT DOCUMENTS

| | | |
|---|---|---|
| 8,384,665 B1 | 2/2013 | Powers et al. |
| 2006/0241792 A1 | 10/2006 | Pretlove et al. |
| | (Continued) | |

FOREIGN PATENT DOCUMENTS

WO    2012007764 A1    1/2012

OTHER PUBLICATIONS

International Search Report and Written Opinion dated Apr. 1, 2016 from corresponding International PCT Application No. PCT/US15/67631, 10 pages.

*Primary Examiner* — Ke Xiao
*Assistant Examiner* — Gordon Liu
(74) *Attorney, Agent, or Firm* — Innovation Capital Law Group, LLP; Vic Lin

(57) ABSTRACT

Systems and methods enabling users to interact with an augmented reality environment are disclosed. Real-world objects may have unique markers which are recognized by mobile devices. A mobile device recognizes the markers and generates a set of virtual objects associated with the markers in the augmented reality environment. Mobile devices employ virtual pointers and virtual control buttons to enable users to interact with the virtual objects. Users may aim the virtual pointer to a virtual object, select the virtual object, and then drag-and-drop the virtual object to a new location. Embodiments enable users to select, move, transform, create and delete virtual objects with the virtual pointer. The mobile device provides users with a means of drawing lines and geometrically-shaped virtual objects.

26 Claims, 25 Drawing Sheets

(51) Int. Cl.
*G06F 3/01* (2006.01)
*G06F 3/0481* (2013.01)

(56) References Cited

U.S. PATENT DOCUMENTS

| | | | |
|---|---|---|---|
| 2007/0038944 A1* | 2/2007 | Carignano | G06T 15/20 |
| | | | 715/757 |
| 2011/0109628 A1* | 5/2011 | Rurin | G06F 3/011 |
| | | | 345/420 |
| 2011/0214082 A1 | 9/2011 | Osterhout et al. | |
| 2012/0122062 A1* | 5/2012 | Yang | G09B 9/00 |
| | | | 434/219 |
| 2012/0122570 A1 | 5/2012 | Baronoff | |
| 2012/0143361 A1 | 6/2012 | Kurabayashi et al. | |
| 2012/0203502 A1* | 8/2012 | Hayes | G01C 15/002 |
| | | | 702/155 |
| 2012/0249741 A1* | 10/2012 | Maciocci | G06F 3/011 |
| | | | 348/46 |
| 2013/0178257 A1 | 7/2013 | Langseth | |
| 2013/0184064 A1 | 7/2013 | Manning et al. | |
| 2013/0201185 A1* | 8/2013 | Kochi | G06F 3/011 |
| | | | 345/419 |
| 2013/0265330 A1 | 10/2013 | Goto et al. | |
| 2014/0028713 A1 | 1/2014 | Keating et al. | |
| 2014/0071164 A1 | 3/2014 | Saklatvala et al. | |
| 2014/0168262 A1 | 6/2014 | Forutanpour et al. | |
| 2014/0282162 A1 | 9/2014 | Fein et al. | |
| 2014/0361988 A1* | 12/2014 | Katz | G06F 3/011 |
| | | | 345/156 |

* cited by examiner

VIRTUAL LASERS FOR INTERACTING WITH AUGMENTED REALITY ENVIRONMENTS

BACKGROUND OF THE INVENTION

1. Field of the Invention

The present invention relates in general to user interfaces for augmented reality environments. More particularly, the invention is directed to mobile devices providing user interfaces for interacting with augmented reality environments.

2. Description of the Related Art

Augmented reality provides users with live views of real-world environments augmented with computer generated virtual objects. These virtual objects may be employed to provide users with information of the real-world environment. However, conventional augmented applications may not provide adequate tools for users to interact with the virtual objects.

Accordingly, a need exists to improve the interaction of users with an augmented reality objects.

SUMMARY OF THE INVENTION

In the first aspect, a machine implemented method for interacting with images in an augmented reality environment is disclosed. The method comprises receiving images of a reality-based environment with a computing device, the computing device having a display capable of providing a real-time view of the reality-based environment, acquiring an image of a real object, and identifying one or more markers on the real object image by the computing device. The method further comprises generating an augmented reality environment having one or more virtual objects combined with the reality-based environment, generating a virtual pointer on the augmented reality environment on the display of the device, selecting a region of the augmented reality environment with the virtual pointer, and performing an action for the selected region.

In a first preferred embodiment, performing an action for the selected region further comprises identifying a virtual object associated with the selected region, and selecting the virtual object associated with the selected region. Performing an action for the selected region preferably further comprises moving the virtual object from a first location to a second location in the augmented reality environment. Performing an action for the selected region preferably further comprises creating an additional virtual object and locating the created additional virtual object at or near the selected region. Performing an action for the selected region preferably further comprises identifying a virtual object associated with the selected region, and deleting the virtual object associated with the selected region. Performing an action for the selected region preferably further comprises generating a line which corresponds to the path swept by the virtual pointer. The virtual pointer is preferably a virtual laser. The virtual pointer is preferably a virtual wand.

Selecting a region of the augmented reality environment with the virtual pointer preferably further comprising pointing the virtual pointer to the region in the augmented reality environment, receiving vibrations resulting from a user tapping on the side of the computing device, and selecting the region of the augmented reality environment. Selecting a region of the augmented reality environment preferably further comprises identifying a first virtual object associated with the selected region, selecting the first virtual object associated with the selected region, identifying a second virtual object associated with the selected region, selecting the second virtual object associated with the selected region, forming a group of virtual objects comprising the first and the second virtual objects, and manipulating the group of virtual objects, wherein the first virtual object is manipulated the same as that of the second virtual object.

In a second aspect, a machine readable non-transitory medium storing executable program instructions which when executed cause a data processing system to perform a method is disclosed. The method comprises receiving images of a reality-based environment with a computing device, the computing device having a display capable of providing a real-time view of the reality-based environment, acquiring an image of a real object, and identifying one or more markers on the real object image by the computing device. The method further comprises generating an augmented reality environment having one or more virtual objects combined with the reality-based environment, generating a virtual pointer on the augmented reality environment on the display of the device, selecting a region of the augmented reality environment with the virtual pointer, and performing an action for the selected region.

In a second preferred embodiment, performing an action for the selected region further comprises identifying a virtual object associated with the selected region, and selecting the virtual object associated with the selected region. Performing an action for the selected region preferably further comprises moving the virtual object from a first location to a second location in the augmented reality environment. Performing an action for the selected region preferably further comprises creating an additional virtual object and locating the created additional virtual object at or near the selected region. Performing an action for the selected region further comprises identifying a virtual object associated with the selected region, and deleting the virtual object associated with the selected region. Performing an action for the selected region preferably further comprises generating a line which corresponds to the path swept by the virtual pointer. The virtual pointer is preferably a virtual laser. The virtual pointer preferably is a virtual wand.

Selecting a region of the augmented reality environment with the virtual pointer preferably further comprising pointing the virtual pointer to the region in the augmented reality environment, receiving vibrations resulting from a user tapping on the side of the computing device, and selecting the region of the augmented reality environment. Selecting a region of the augmented reality environment preferably further comprises identifying a first virtual object associated with the selected region, selecting the first virtual object associated with the selected region, identifying a second virtual object associated with the selected region, selecting the second virtual object associated with the selected region, forming a group of virtual objects comprising the first and the second virtual objects, and manipulating the group of virtual objects, wherein the first virtual object is manipulated the same as that of the second virtual object.

In a third aspect, a device is disclosed. The device comprises an input panel configured to receive user input, and at least one processing system coupled to the input panel, the at least one processing system having one or more processors configured to generate and interact with an augmented reality environment based on at least the user input. The at least one processing system operable to perform the operations including receiving images of a reality-based environment with a computing device, the computing device having a display capable of providing a real-time view of the reality-based environment, acquiring an image of a real object, and identifying one or more markers on the real object image by the computing device. The at least one processing system further operable to perform the operations including generating an augmented reality environment having one or more virtual objects combined with the reality-based environment, generating a virtual pointer on the augmented reality environment on the display of the device, selecting a region of the augmented reality environment with the virtual pointer, and performing an action for the selected region.

In a third preferred embodiment, the at least processing system is preferably further operable to perform the operations comprising identifying a virtual object associated with the selected region, and selecting the virtual object associated with the selected region. Performing an action for the selected region preferably further comprises moving the virtual object from a first location to a second location in the augmented reality environment. Performing an action for the selected region preferably further comprises creating an additional virtual object and locating the created additional virtual object at or near the selected region.

Selecting a region of the augmented reality environment with the virtual pointer preferably further comprising pointing the virtual pointer to the region in the augmented reality environment, receiving vibrations resulting from a user tapping on the side of the computing device, and selecting the region of the augmented reality environment. Selecting a region of the augmented reality environment preferably further comprises identifying a first virtual object associated with the selected region, selecting the first virtual object associated with the selected region, identifying a second virtual object associated with the selected region, selecting the second virtual object associated with the selected region, forming a group of virtual objects comprising the first and the second virtual objects, and manipulating the group of virtual objects, wherein the first virtual object is manipulated the same as that of the second virtual object.

These and other features and advantages of the invention will become more apparent with a description of preferred embodiments in reference to the associated drawings.

DETAILED DESCRIPTION OF THE PREFERRED EMBODIMENTS

The following preferred embodiments are directed to mobile devices configured to provide users with a means to interact with augmented reality environments. An augmented reality environment is a combination of real-world, tangible object images along with computer-generated virtual objects superimposed upon the real-world images. Augmented reality is often registered in three-dimensions, and typically provides a user with the ability to interact with the environment in real time. Users typically interact with an augmented reality environment by employing some type of device such as headset goggles, glasses, or mobile devices having displays.

In one or more embodiments, a mobile device such as a smart phone or tablet is employed by a user to view and interact with an augmented reality environment. Looking at the display of the mobile device, a user may see images of real-world objects of his immediate surroundings along with virtual objects superimposed on the real world images. By moving or tilting the mobile device, the user may change the view of the augmented reality environment to inspect both the real-world and the virtual objects. A user may interact with the augmented reality environment by launching a virtual laser pointer on the display and aiming the virtual laser toward a virtual object. The user may then select the virtual object, and may manipulate the virtual object by moving, transforming, deleting, or rotating the virtual object. The virtual laser provides a live, real time ability to interact with a three-dimensional augmented reality environment.

As used herein and as is commonly known in the art, the terms "virtual," "augmented," "augmented reality environment," and "augmentation" may refer to items which are added to a display of a real scene, and may include computer generated icons, images, virtual objects, text, or photographs. Reference made herein to a mobile device is for illustration purposes only and shall not be deemed limiting. Mobile device may be any electronic computing device, including handheld computers, smart phones, tablets, laptop computers, smart devices, GPS navigation units, or personal digital assistants for example. Embodiments described herein make reference to virtual pointers, virtual lasers, virtual wands, and virtual cross-hair targets; however, it shall be understood that the specific type of virtual pointer for an embodiment is for illustration purposes only and that the various types of virtual pointers are interchangeable in one or more embodiments. The term real object refers to physical, tangible real-world objects and the term real object image or image of a real object refer to the image captured, processed, and displayed in a mobile device display.

Figure 1A:
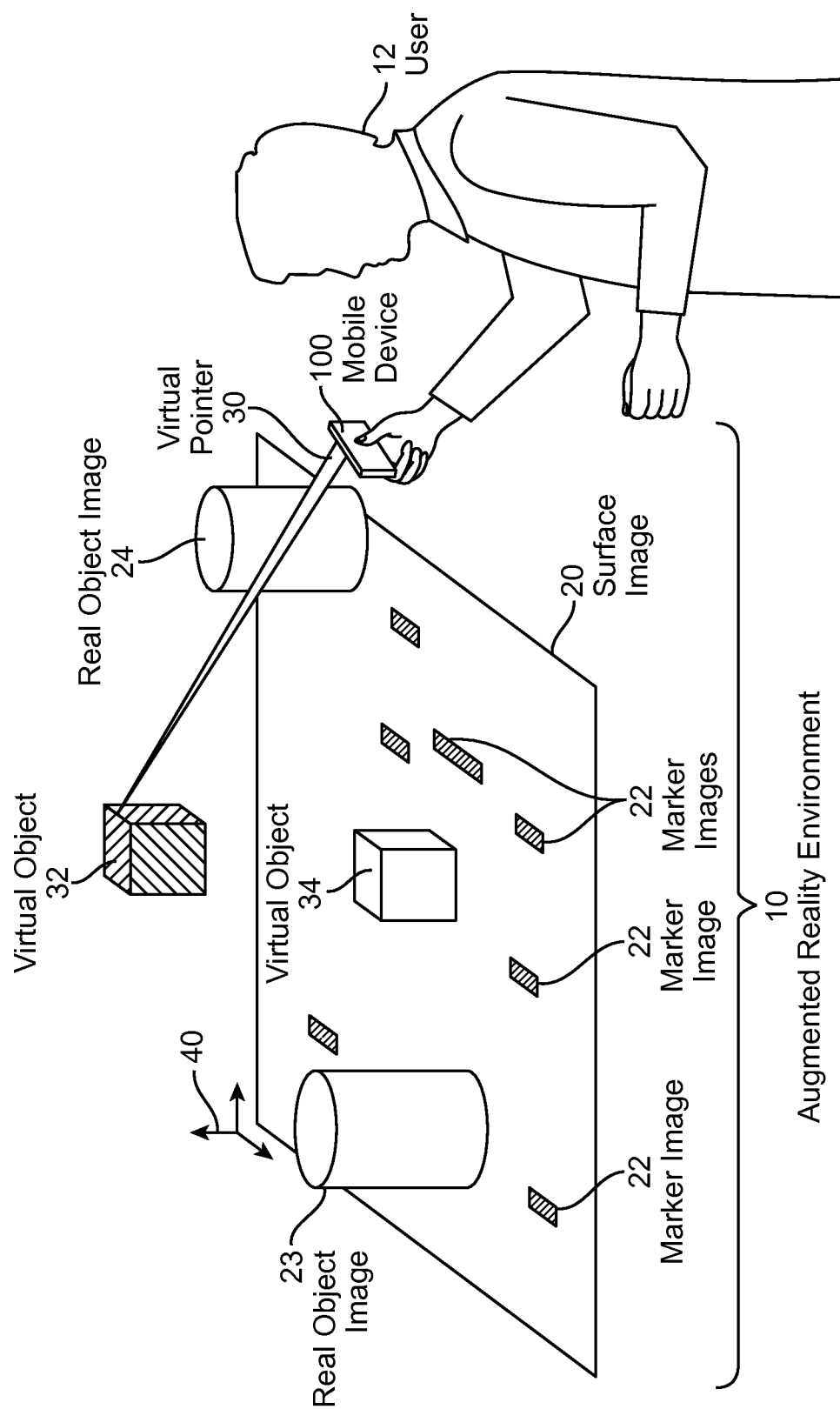
FIG. 1A is a front, perspective view of a user selecting a virtual object with a virtual laser in an augmented reality environment. The virtual laser pointer symbolically emerges from the mobile device.

FIG. 1A depicts a representation of a user 12 interacting with an augmented reality environment 10. The augmented reality environment comprises both real-world object images and virtual components. The real-world images include a plurality of marker images 22 on an optional surface image 20, and real object images 23 and 24. The real-world images such as surface image 20 are the images of the corresponding real-world, tangible objects which are captured, processed, and displayed in the mobile device 100. The virtual components include a virtual pointer (e.g., a virtual laser) 30 symbolically emerging from the mobile device 100, as well as virtual objects 32 and 34. In one or more embodiments, surface image 20 is optional, the tracking relies on marker images 22 only, or relies on physical objects such as 24, or relies on a combination of marker images and physical objects. In one or more embodiments, the surface image may not be flat. Specifically, marker images may be positioned at various heights and locations instead of being confined to the surface image plane.

The mobile device 100 detects marker images 22 on the surface image 20, and then generates a coordinate system 40 based on these marker images 22. The mobile device 100 employs the coordinate system 40 to generate an augmented reality environment 10 having virtual objects 32 and 34 positioned with respect to the coordinate system 40 in an embodiment. If the user 12 moves relative to the marker images 22, the virtual objects 32 and 34 will similarly move. The virtual pointer 30, however, is positioned relative to the display of the mobile device 100. Hence, when the user 12 tilts or moves the mobile device 100, the virtual pointer 30 navigates throughout the augmented reality environment 10. FIG. 1A depicts the user 12 pointing to and selecting virtual object 32 with the virtual pointer 30.

Figure 1B:
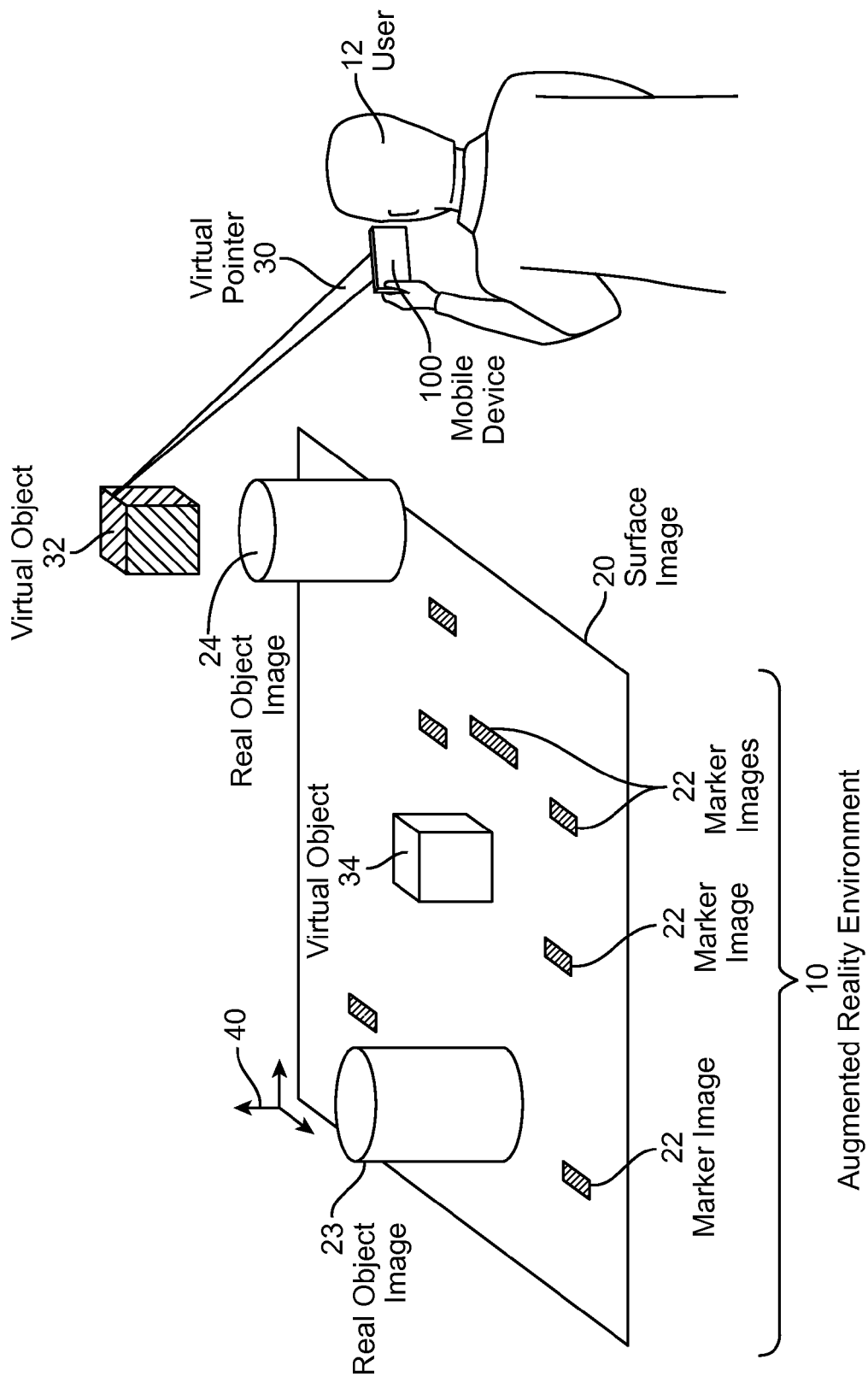
FIG. 1B is a front, perspective view of the user moving the selected virtual object to a different location in the augmented reality environment.

As illustrated in FIGS. 1A and 1B, the user 12 may select and "grab" the virtual object 32, and then may reposition the virtual object 32 by moving or "dragging" the virtual object 32 to a location above the real object image 24 in an embodiment. The user 12 may then release the virtual object 32 from the virtual pointer 30, leaving the virtual object 32 to float above the real object image 24. In one or more embodiments, a selected virtual object may be manipulated by such means as by the virtual object being moved, rotated, deleted, rescaled, or reshaped for example. As used herein, the cross hatch pattern on the surface of a virtual object may indicate that the virtual object was selected by the virtual pointer in one or more embodiments. The actual surface characteristics of the selected virtual object as seen by the user 12 through the mobile device 100 may change or may remain unaltered in one or more embodiments. One or more embodiments may employ haptic feedback such as using vibration motors. Haptic feedback may be triggered when laser pointer points at or selects certain virtual object.

Figure 1C:
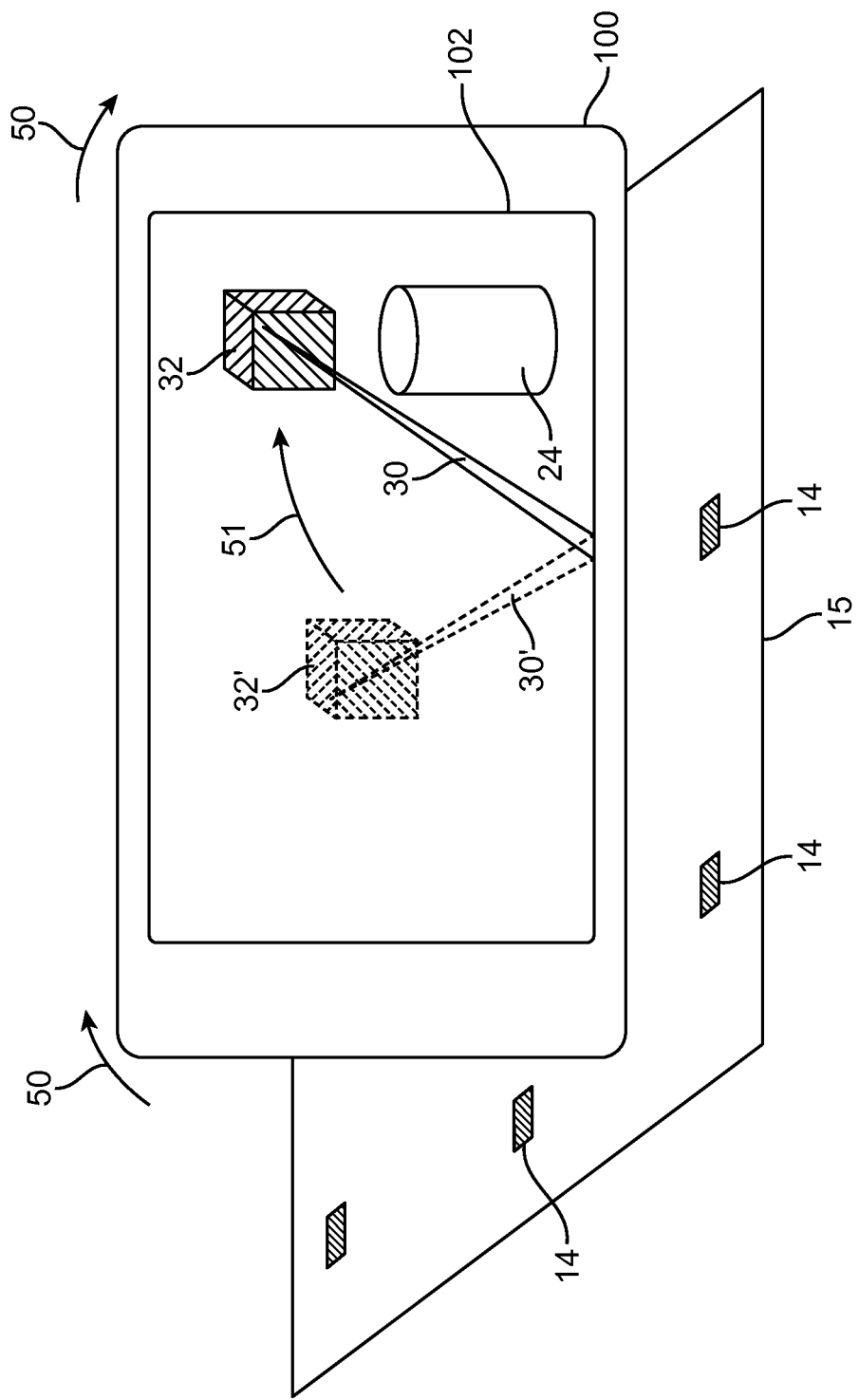
FIG. 1C is an abstract representation of a front view of a mobile display having a display showing a representation of the augmented reality environment.

FIG. 1C is an abstract representation of a top view of a display 102 of a mobile device 100 as seen by the user 12 in in the scenarios depicted in FIGS. 1A and 1B. In one or more embodiments, the virtual pointer 30 is fixed to a position on the display 102. In one or more embodiments, the virtual laser 30 can move with the virtual object 32 together with the movement of the mobile device 100 such as a phone. Hence, FIG. 1C is an abstract representation of the operation of the mobile device 100 and is employed to depict that motion in the physical world is translated to motion in the augmented reality environment, Mobile device 100 is viewing a real surface 15 having real markers 14. Virtual pointer 30' and virtual object 32' illustrate the view to the user 12 in the scenario depicted in FIG. 1A, and virtual pointer 30 and virtual object 32 illustrate the view to the user 12 for the scenario depicted in FIG. 1B. The user 12 navigates through the augmented reality environment 10 and points the virtual pointer 30' to select virtual object 32'. The user 12 then moves and tilts the mobile device 100 as indicated by the motion arrows 50, which is translated into a corresponding motion in the augmented reality environment 10 as indicated by motion arrow 51. The virtual object 32 is now positioned above real object image 24 as described above.

In one or more embodiments, the marker images 22 and surface image 20 are not necessarily part of the augmented reality ("AR") scene displayed on the device screen. In one or more embodiments, marker images 22 and surface image 20 may be designed to be blocked, covered or replaced by virtual objects in the virtual scene, in a way that they may not show up on device screen 102. In one or more embodiments, marker images 22 may be seen as replaced by virtual objects instead of as-is on device screen 102.

In one or more embodiments, a user may interact with a three-dimensional augmented reality environment 10 by employing a virtual pointer 30 on the display 102 of the mobile device 100. When a user 12 moves a mobile device 100 with respect to an augmented reality environment 10, the motion of the mobile device 100 is translated into motion of the virtual pointer 30 through the augmented reality environment 10 as seen on the display 102 of the mobile device 100. The user 12 navigates the virtual pointer 30 throughout the augmented reality environment 10 and selects a virtual object by pressing a button or tapping the mobile device 100 or speaking voice control commands, which may move or otherwise manipulate the virtual object.

One or more embodiments effectively immerse users in an augmented reality environment. The laser pointer 30 is displayed on a hand-held mobile device 100. The virtual laser 30 is orientated in a way that it points out of the back of the screen into the augmented reality. The images on the display 102 rotate with the hand-held mobile device 100, and because it is rendered as augmented reality content on top of the video streaming from back-facing camera or a front-facing camera, the user 12 feels like the laser pointer 30 "grows" on the device.

Figure 1D:
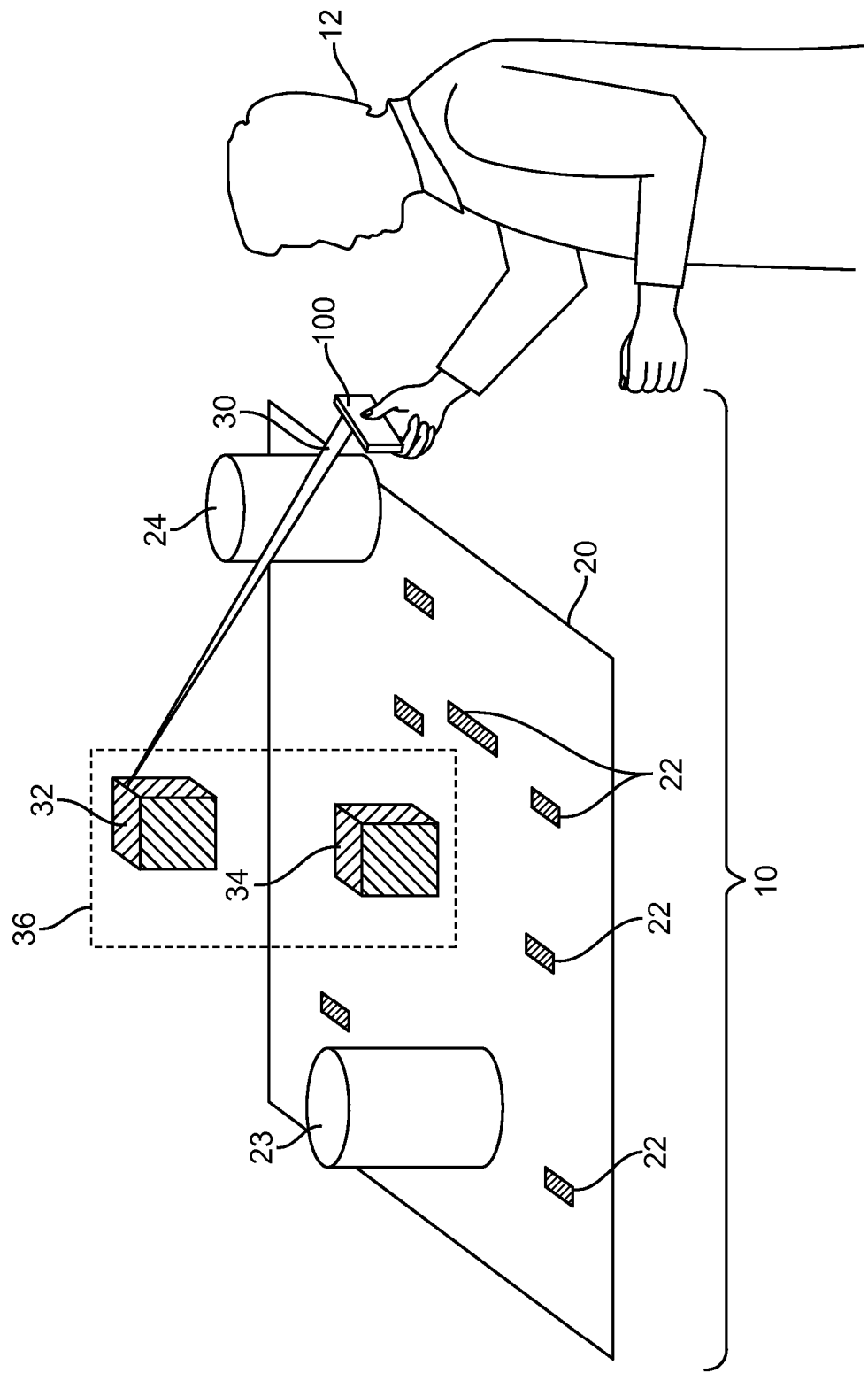
FIG. 1D is a front, perspective view of the user selecting and grouping two virtual objects in the augmented reality environment.
Figure 1E:
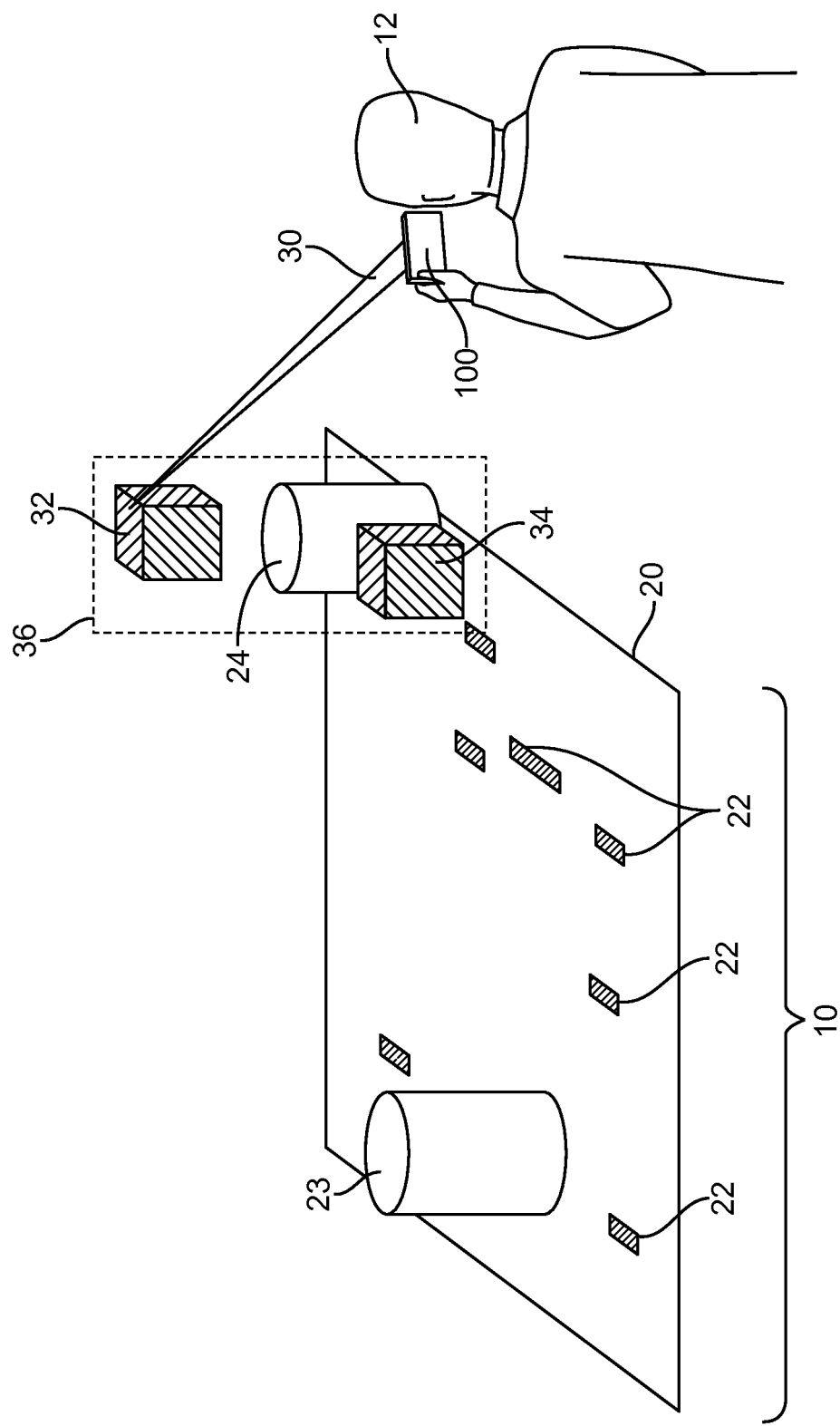
FIG. 1E is a front, perspective view of the user moving the group of selected virtual objects to a different location in the augmented reality environment.

FIGS. 1D and 1E illustrate a virtual pointer 30 selecting multiple virtual objects 32 and 34 to form a group 36 such that the virtual objects 32 and 34 may be manipulated simultaneously. FIG. 1D illustrates the user 12 forming a group 36 of virtual objects 32 and 34. As depicted in FIG. 1E, the user 12 may then attach or "grab" the group 36 with the virtual pointer 30 and then reposition the group 36 to a new location. The relative position of the virtual object 32 is unchanged with respect to virtual object 34 in one or more embodiments.

Figure 1F:
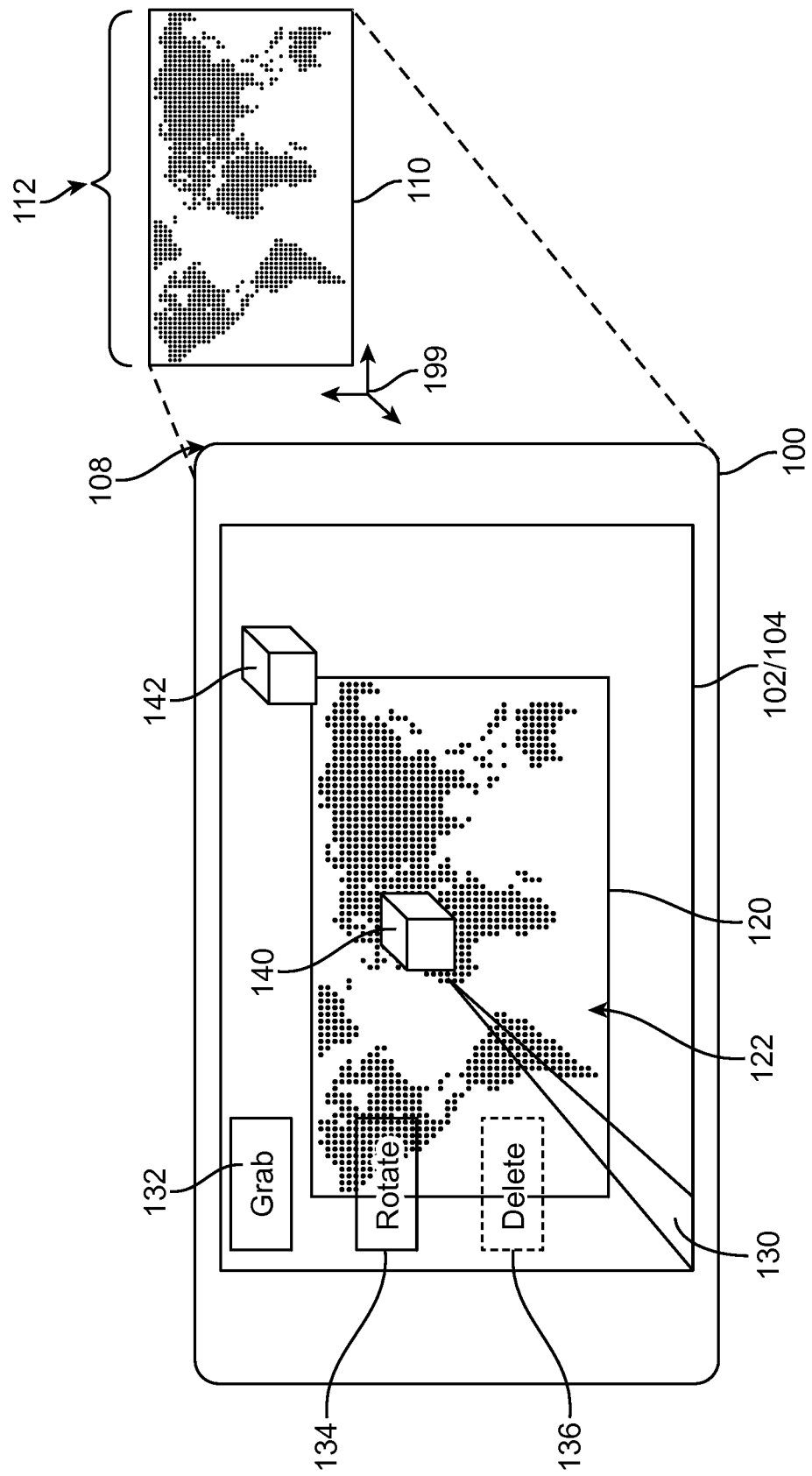
FIG. 1F is a front view of a mobile device having a display showing the images of a real object and markers in the augmented reality environment.

FIG. 1F is a view of a mobile device 100 viewing a real object 110 having markers 112. The mobile device 100 has a display 102, a touch screen 104 overlaying the display 102, and a camera 108 in one or more embodiments. The camera 108 captures the images of the real object 110 and the mobile device 100 displays the real-time view of the real object image 120 on the display 102.

The mobile device 100 detects marker images 122 or other interest points from the camera images. The mobile device 100 then generates a coordinate system 199 based on the marker images 122. The mobile device 100 employs the coordinate system 199 to generate an augmented reality environment having virtual objects 140 and 142 positioned within the coordinate system 199 in an embodiment.

In one or more embodiments, the positioning of the virtual objects 140 and 142 is based on the orientation and position of the marker images 122. Should a user 12 rotate or reposition the real object 110, the marker images 122 as detected by the mobile device 100 will also similarly reposition which will cause the virtual objects 140 and 142 to similarly rotate or reposition as well. Likewise, if a user 12 moves relatively to the real object 100, the mobile device 100 will similarly move with respect to the coordinate system 199, which will cause the virtual objects 140 and 142 to similarly move. Hence, a user 12 may observe the surfaces of the virtual objects 140 and 142 by moving the real object 110 or by the user tilting and moving the mobile device 100.

The mobile device 100 also generates a virtual pointer 130 and virtual control buttons 132 ("Grab"), 134 ("Rotate"), and 136 ("Delete") in an embodiment. In an embodiment, the virtual pointer 130 and the virtual control buttons 132, 134, and 136 are positioned relative to the display 102 coordinates such that the pointer 130 and buttons 132, 134, and 136 appear fixed in the display 102 as a user moves or tilts the mobile device 100. In an embodiment, the virtual pointer 130 may be moved or redirected with respect to the display 102.

As the screen size of the display 102 is very limited on mobile device 100, one or more embodiments contemplate placing only a few control buttons at the border of the display screen 102. In one or more embodiments, virtual control button 134 may be semi-transparent enabling the user 12 to see the image immediately behind the button 134. In an embodiment, virtual control button 136 may automatically hide to prevent blocking of the rendered content on the display 102. The button automatically appearing and/or hiding may be determined by the laser pointer interaction, for example, the "delete" button appears only when an objects is selected, and remains hidden when nothing is selected.

A user 12 may tilt or move the mobile device 100 such that the virtual pointer 130 moves over the virtual objects 140 or 142. As depicted in this example, the end of the virtual pointer 130 hovers above the virtual object 140. A user may then select virtual object 140 by pressing the virtual control button 132 in an embodiment. Once selected, the virtual object 140 may be manipulated such as by being moved, rotated, deleted, rescaled, or reshaped for example.

Figure 1G:
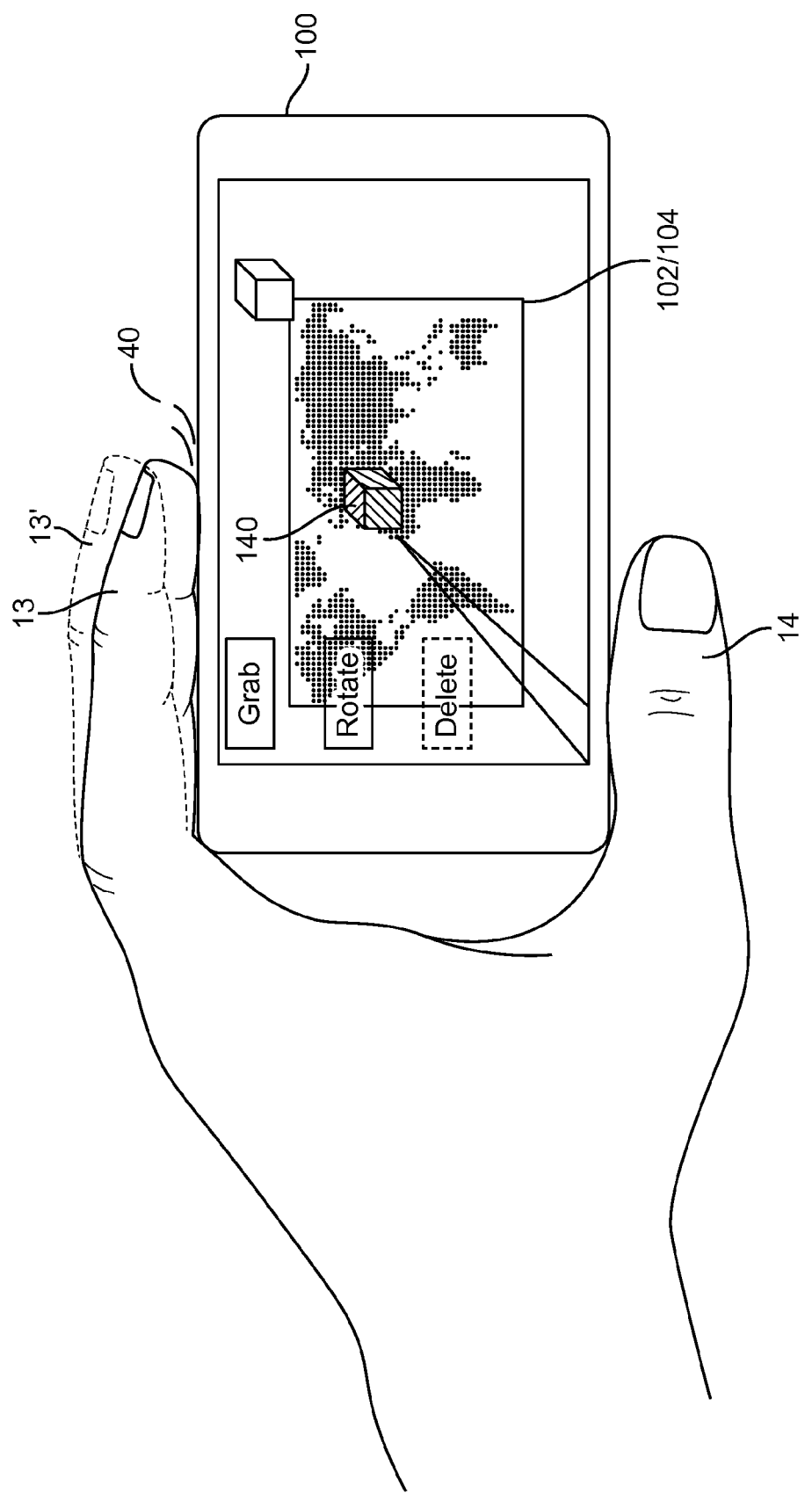
FIG. 1G is a front view of a mobile device illustrating that the user's tapping of the side of the mobile device triggers the selection of an object.

FIG. 1G illustrates that a user 12 may select a virtual object 140 such as by tapping on the side of the mobile device 100. In an embodiment, a user 12 may hold the mobile device 100 with a forefinger 13 and thumb 14. A user 12 may then slightly release his forefinger (as indicated by 13') and tap the side of the mobile device 100 to create vibrations as indicated by 40. Tapping on the side of the mobile device can be detected by monitoring the accelerometer or sensor readings of the mobile device 100. One or more embodiments utilize the tapping as a trigger. When a tap is detected, the objects intersected by the virtual laser will snap and move along with the virtual laser. A second tap releases the object. This feature may allow users to assemble and disassemble three-dimensional objects in a very intuitive way. In one or more embodiments, voice control is contemplated. For example, a user 12 may say "grab" to grab the selected object, and may say "release" to release the object.

Figure 1H:
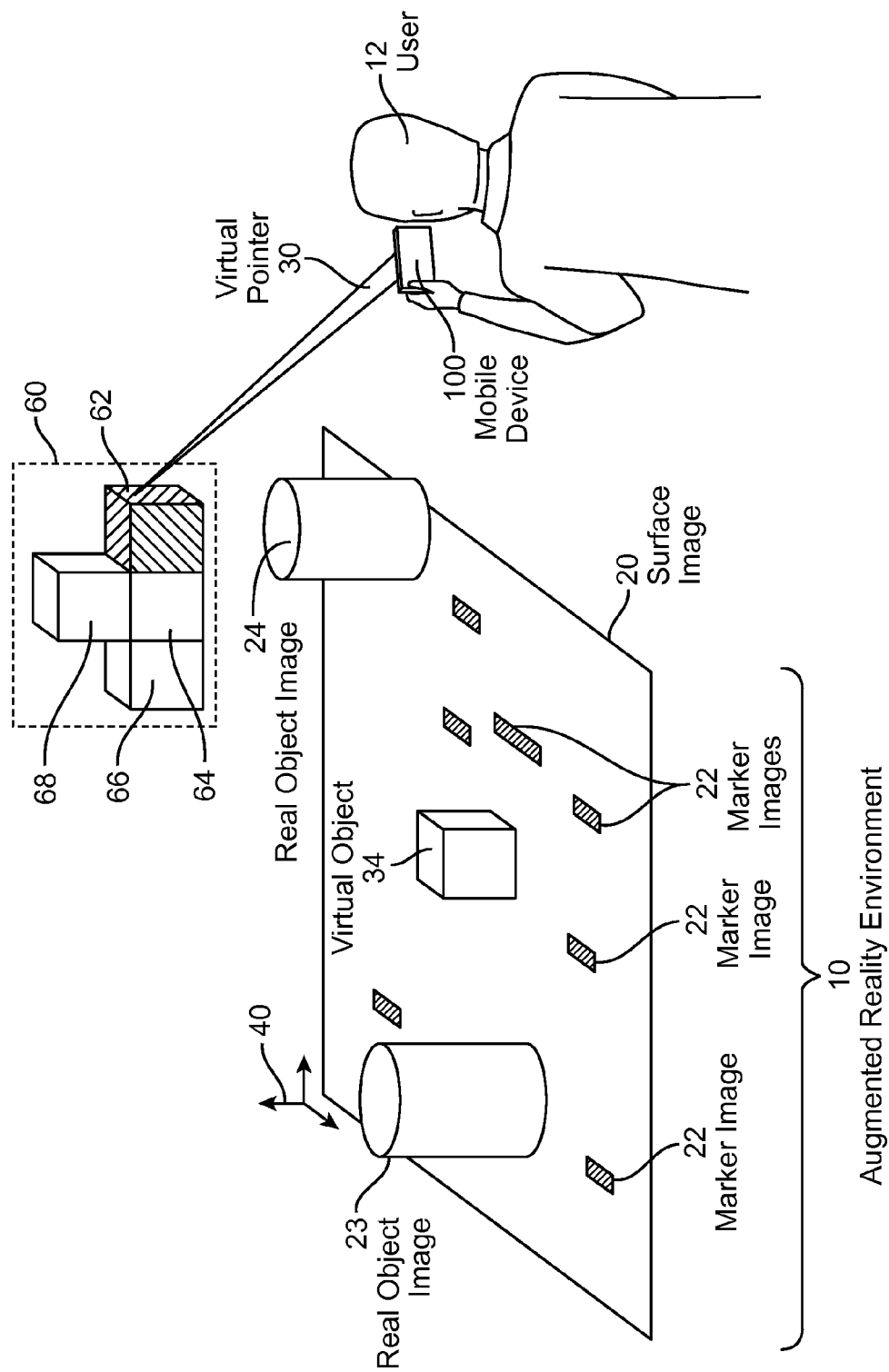
FIG. 1H is a front, perspective view of a user selecting and disassembling a virtual object from a group of virtual objects.
Figure 1I:
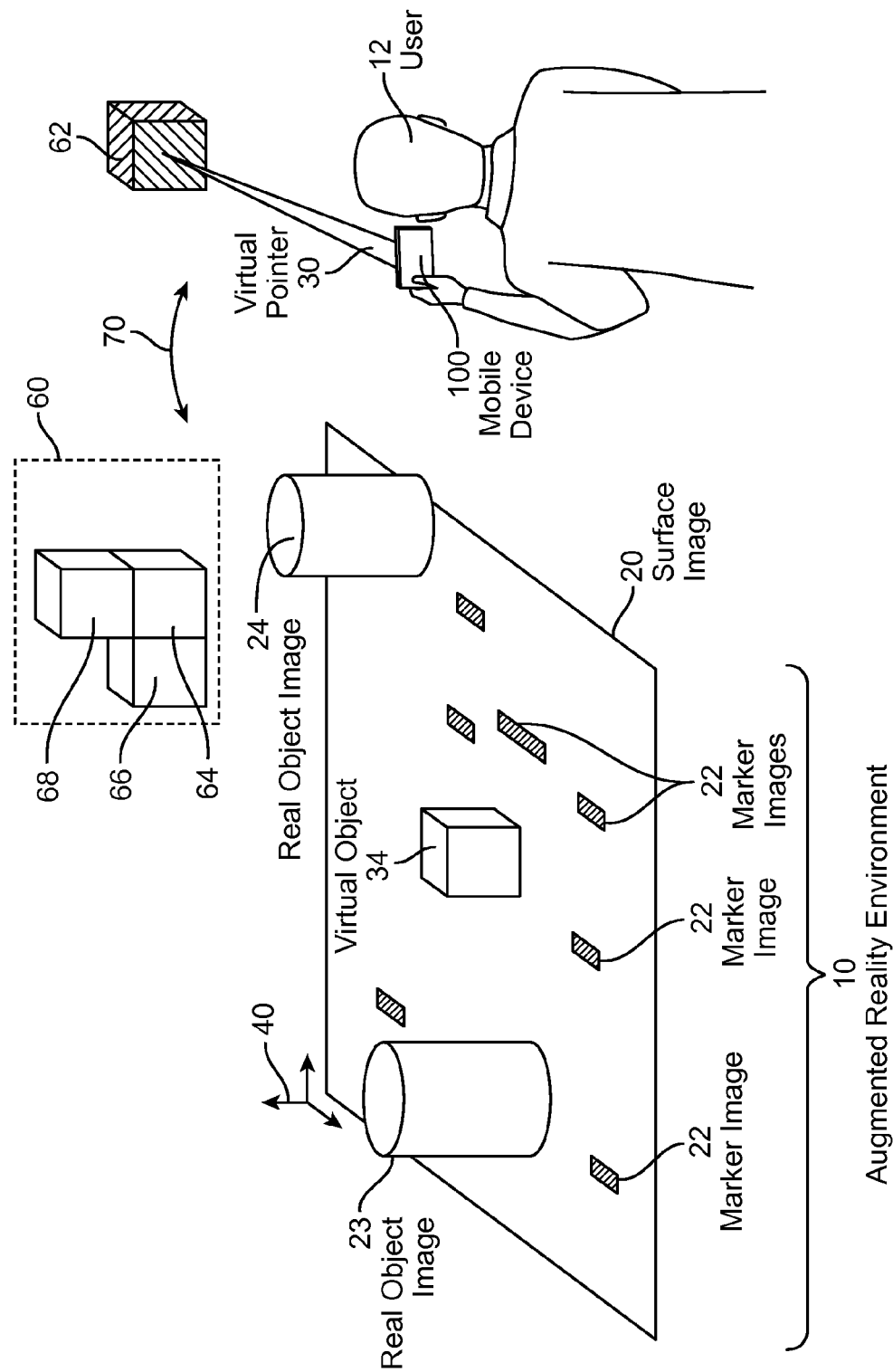
FIG. 1I is a front, perspective view of the user disassembling and moving the selected virtual object to a different location in the augmented reality environment.

FIG. 1H is a front, perspective view of a user 12 selecting and disassembling a virtual object 62 from a group of virtual objects 60. A group of objects 60 comprises virtual objects 62, 64, 66, and 68. In one or more embodiments, the group of objects 60 represents an assembled part or component where the virtual objects 62, 64, 66, and 68 are physically coupled. The user 12 points to, selects, and disassembles virtual object 62 from the group 60 of virtual objects. As shown in FIG. 1I, the virtual pointer 30 secures or "grabs" the virtual object 62, and the user 12 may reposition virtual object 62 to a new location.

Figure 1J:
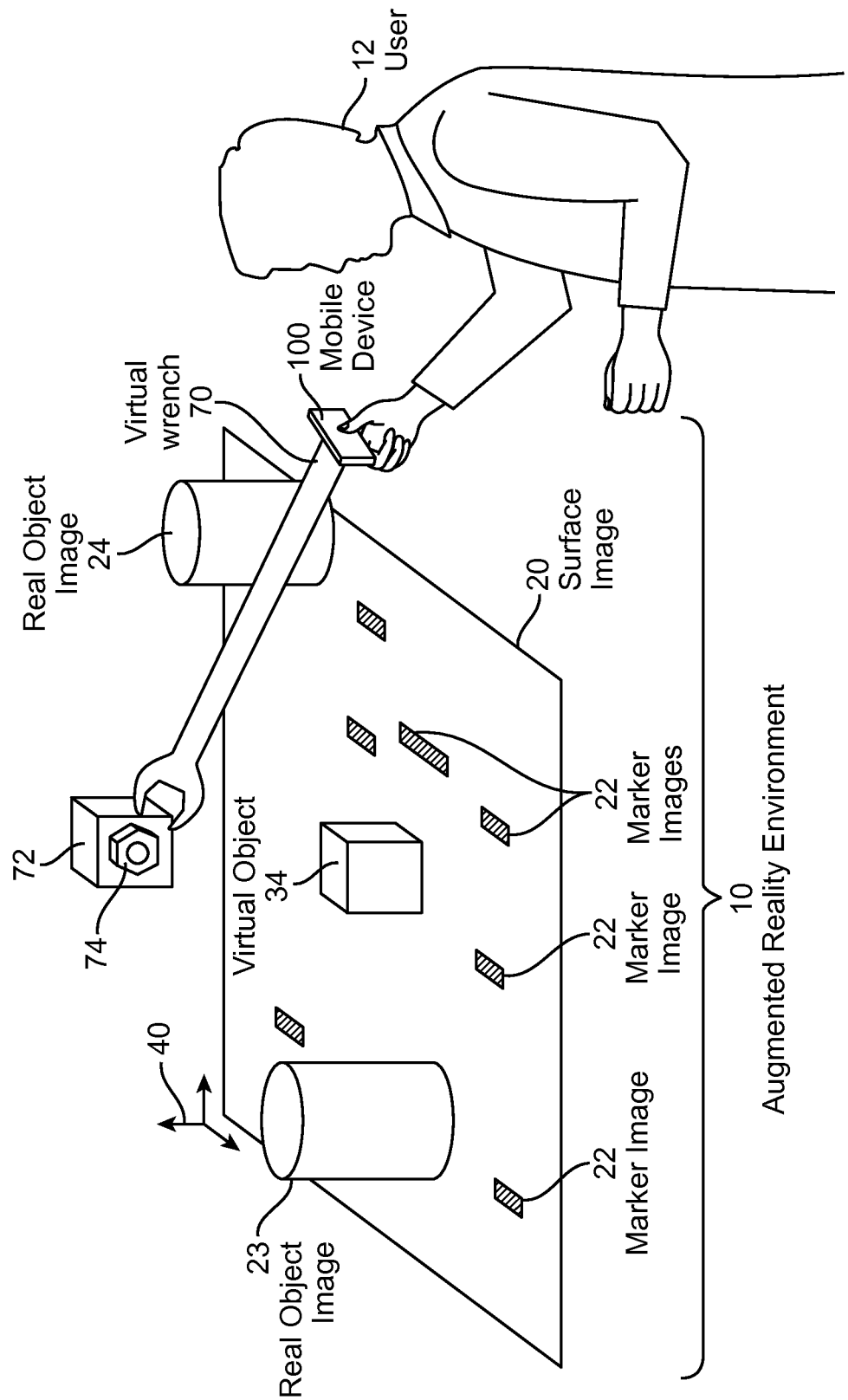
FIG. 1J is a front, perspective view of a user manipulating a virtual object with a virtual wrench in an augmented reality environment.

FIG. 1J is a front, perspective view of a user 12 manipulating a virtual object 74 (i.e., the virtual nut) with a virtual wrench 70 in an augmented reality environment 10. The user 12 may point to and select the virtual nut 12 employing the virtual wrench 70. In one or more embodiments, the mobile device 100 may offer controls which enable a user 12 to rotate and remove a virtual nut 74 from the virtual block 72. Other types of virtual tools such as screwdriver, drills, saws, knifes, and hoists for example are contemplated in one or more embodiments.

Figure 1K:
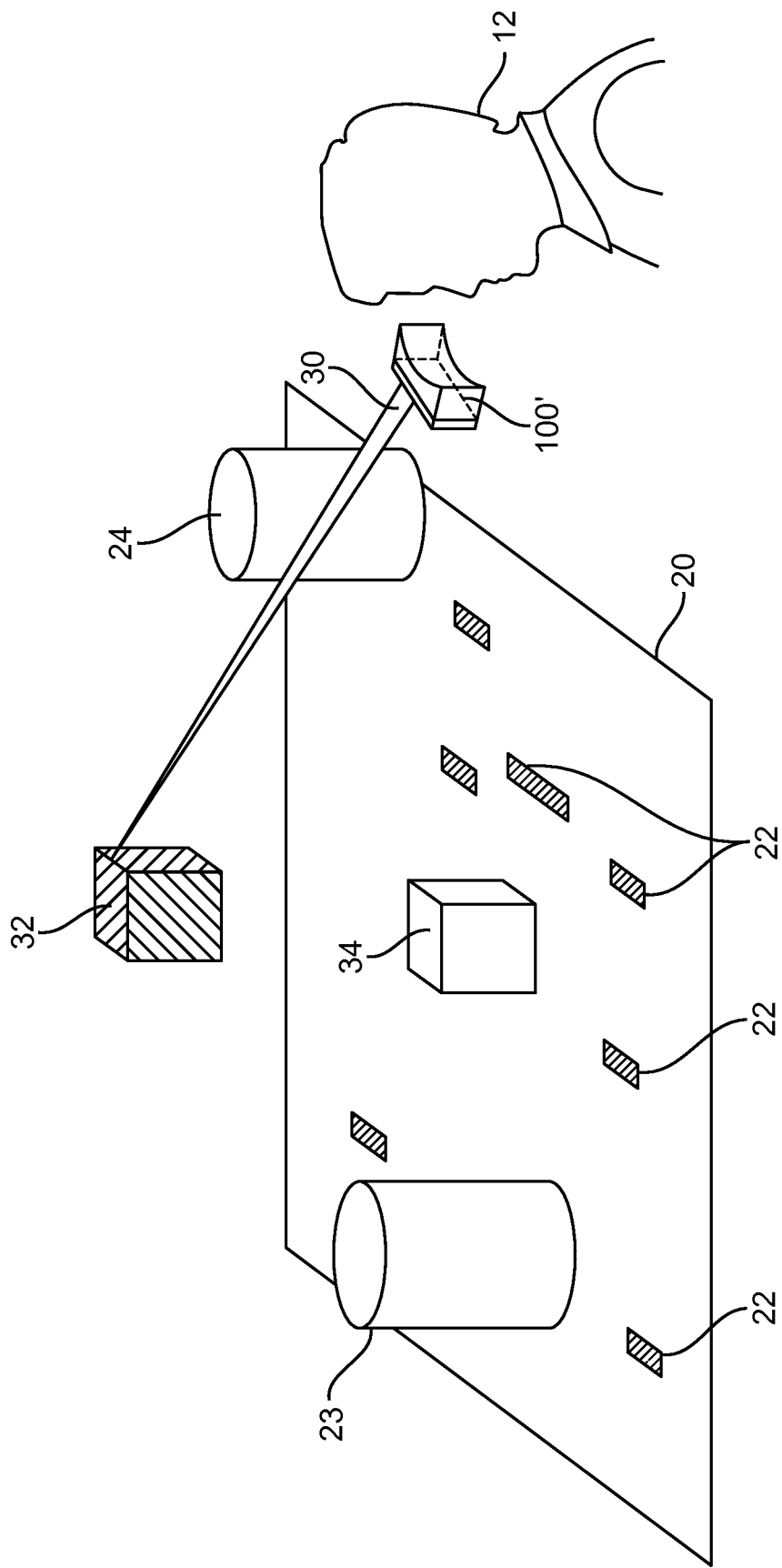
FIG. 1K is a front, perspective view of a user selecting a virtual object with a virtual laser in an augmented reality environment, the computing device is in the form of head-mounted, and is capable providing a stereoscopic, hands-free interaction experience.

FIG. 1K shows an embodiment of a mobile device 100' in the form of head-mounted device. User 12 places the device 100' in front of the eyes. User may see 3D stereoscopic images. The user's hands are freed up. User may move and rotate his head in order to move the virtual laser pointer 30. User 12 may use tapping on device, voice command to interact. User 12 may also Wi-Fi or Bluetooth enabled devices for interaction. The Wi-Fi or Bluetooth enabled devices may include digital rings, digital wrist-bands, hand and/or finger tracking devices, smart watches, etc.

Figure 2:
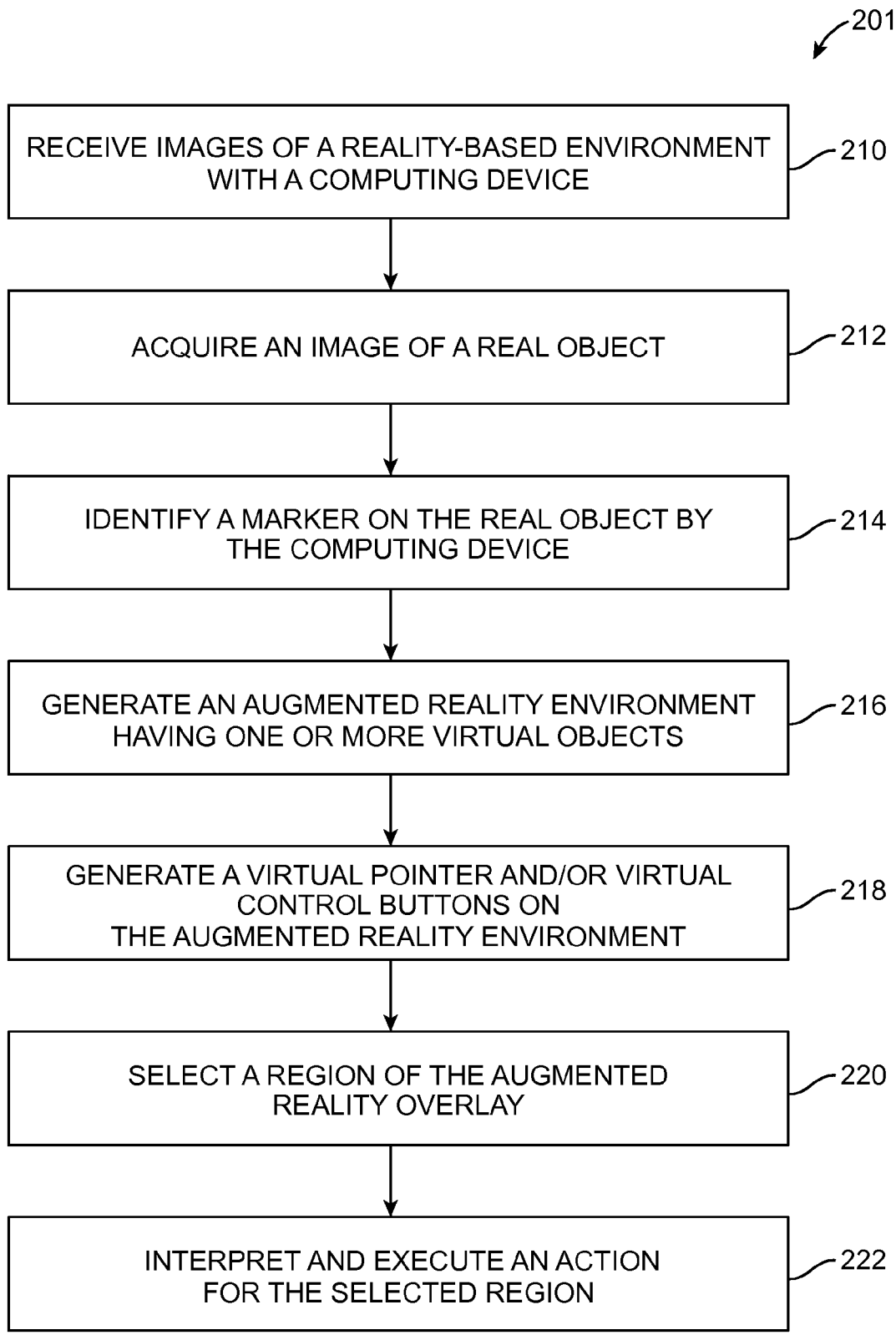
FIG. 2 is an exemplary flowchart illustrating a method for a user to interact with virtual objects in an augmented reality environment.

FIG. 2 depicts an exemplary method 201 for a user to interact with virtual objects in an augmented reality environment 10. A mobile device 100 receives the images of a reality based environment 10 (step 210). The mobile device 100 may receive the images of a reality based environment via the camera 108 in the mobile device 100 in one or more embodiments. The mobile device 100 acquires an image of a real object (step 212). In one or more embodiments, the step of acquiring an image of a real object may be optional and may be skipped. The mobile device 100 identifies one or more markers 22 on the real object 20 (step 214). The device 100 then generates an augmented reality environment 10 having one or more virtual objects (step 216). In one or more embodiments, the device 100 recognizes the marker 22, determines the augmented reality environment 10 which corresponds to the marker, and generates virtual objects associated with the specific augmented reality environment 10.

The device 100 may generate a virtual pointer 30 and/or one or more virtual or on-screen control buttons (e.g., virtual or on-screen control buttons 132, 134, or 136 on FIG. 1F) on the augmented reality environment 10 (step 218). The virtual pointer comprises a virtual laser pointer 130 as shown in FIG. 1F in one or more embodiments.

Figure 4:
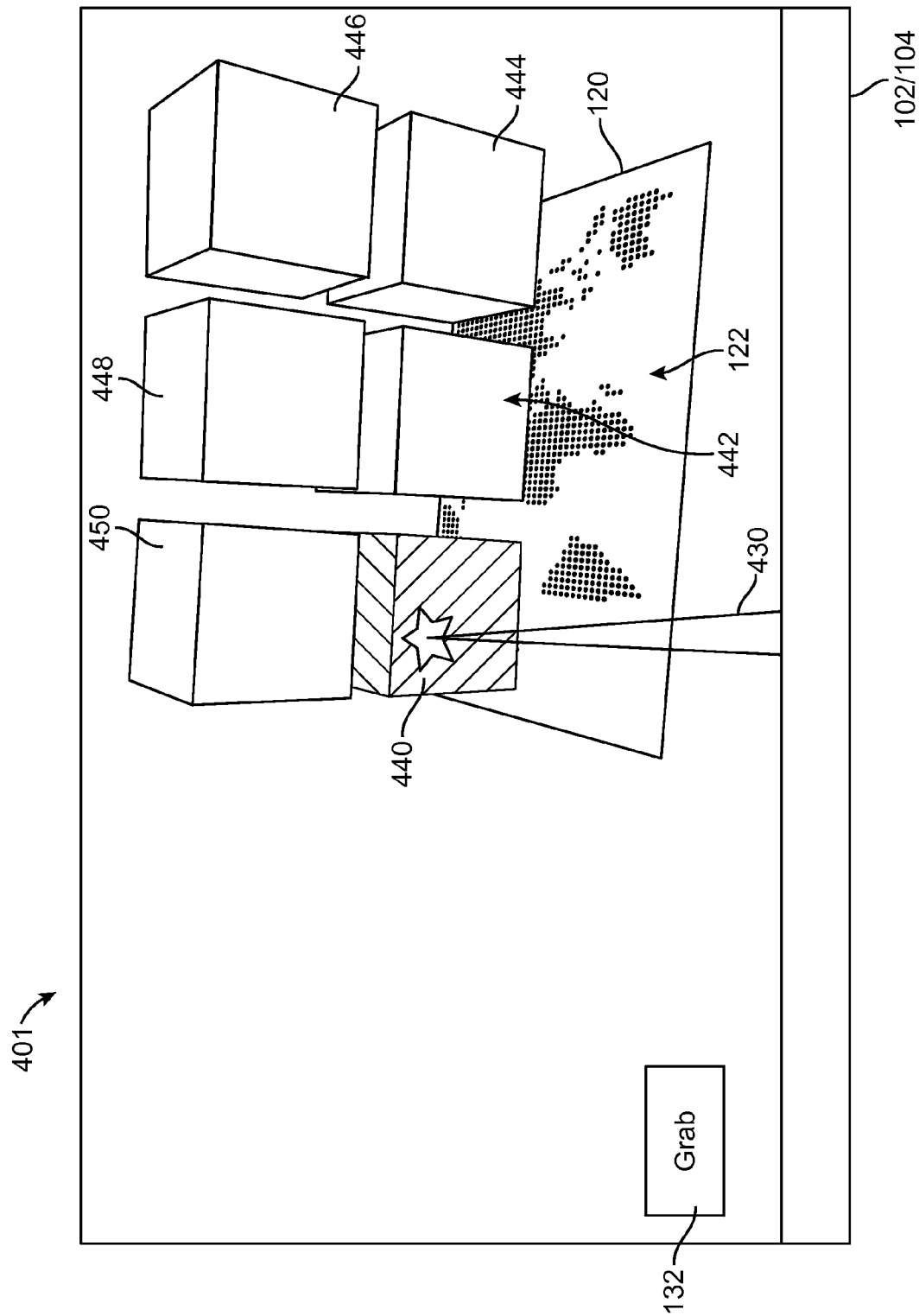
FIG. 4 is a top view of a display showing an image of a real object, virtual objects, and a virtual wand for selecting the virtual objects in an embodiment.

The virtual pointer 130 may comprise a cross-hair pattern generated on the display (see virtual cross-hair target 1030 in FIG. 10), a predetermined region of the display such as the center of the display, or by other shapes in one or more embodiments (see virtual wand in FIG. 4).

A region of the augmented reality environment is selected (step 220). Selecting a region may refer to selecting a specific object out of a group of objects such that the selected object may be moved, deleted, rotated, transformed or otherwise manipulated in one or more embodiments. Selecting a region of an augmented reality environment may refer to selecting a point, area, or volume within the augmented reality environment 10 such that the user 12 may create or paste a new object at the location defined by the region, or may otherwise manipulate the region of the augmented reality environment 10. In one or more embodiments, a region of the augmented reality environment 10 may be selected as a result of the virtual pointer 130 pointing to a virtual object and a user engaging the virtual control button such as virtual control buttons 132, 134, and 136 in FIG. 1F. The region of the augmented reality environment 10 may also be selected by pointing to the virtual object without other actions. The region may be selected as a result of a user pointing to the virtual object with a virtual pointer and performing a secondary action such as by pressing the hardware button on the mobile device, providing a voice command, tapping the touch screen, or by other means in one or more embodiments.

The selection is interpreted and an action for the selected region is performed. (step 222). The virtual objects may be captured, moved, transformed within the augmented reality environment 10, and released. A virtual object may be rotated, deleted, change colors, change shape, be rescaled, or reveal other features of the virtual object in one or more embodiments. In an embodiment, performing an action for the selected region further comprises identifying a virtual object associated with the selected region, and selecting the virtual object associated with the selected region. In an embodiment, performing an action for the selected region further comprises moving the virtual object from a first location to a second location in the augmented reality environment. In an embodiment, performing an action for the selected region further comprises creating an additional virtual object and locating the created additional virtual object at or near the selected region. In an embodiment, performing an action for the selected region further comprises identifying a virtual object associated with the selected region, and deleting the virtual object associated with the selected region. In an embodiment, performing an action for the selected region further comprises generating a line which corresponds to the path swept by the virtual pointer. The virtual pointer may comprise a virtual laser, a virtual wand, or a virtual cross-hair target in one or more embodiments.

Figure 3:
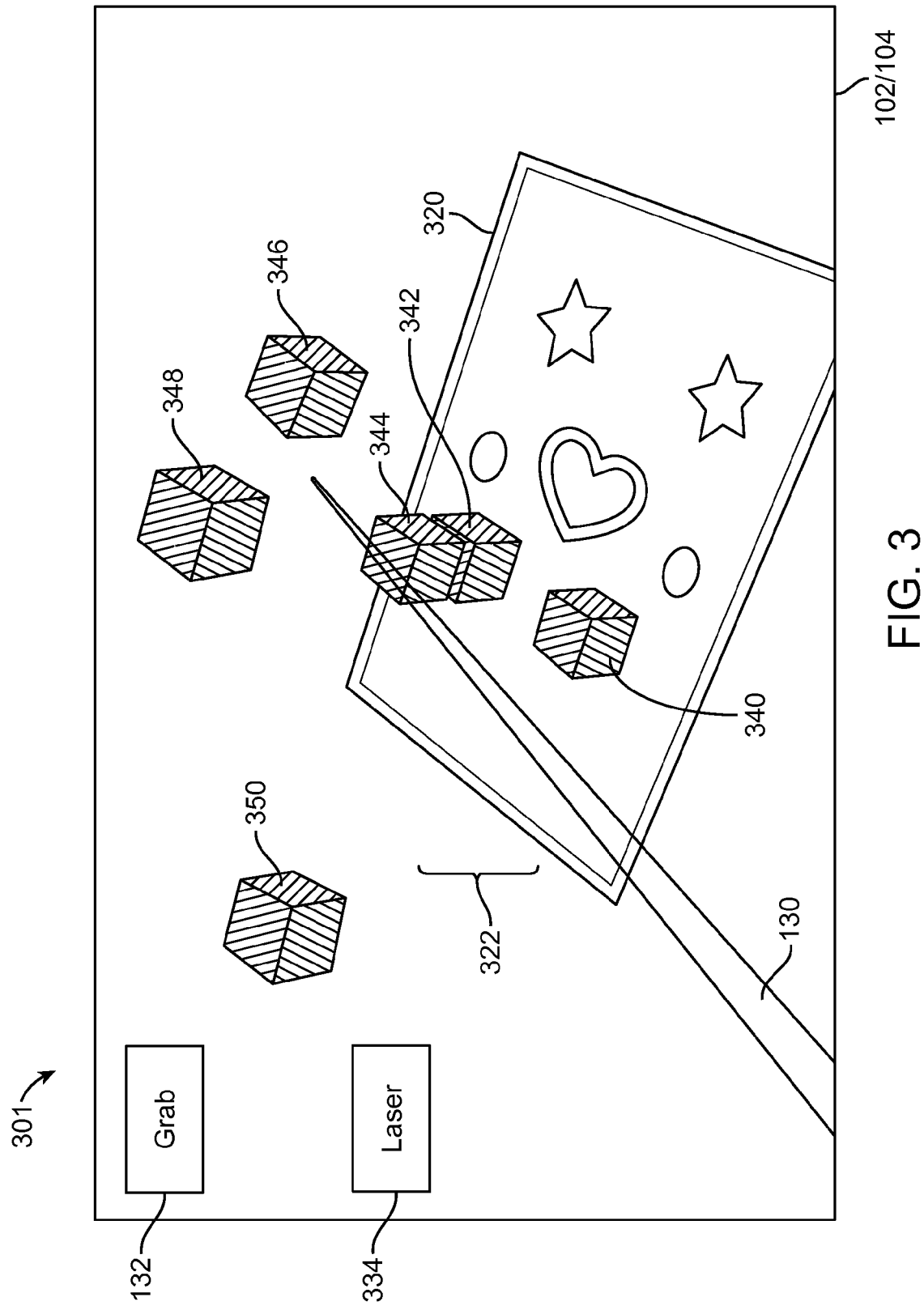
FIG. 3 is a top view of a display showing an image of a real object, virtual objects, a virtual pointer, and virtual control buttons in an embodiment.

FIG. 3 is a view 301 of the display 102 and the touch screen 104 of a mobile device 100. The display 102 shows real object image 320 having marker images 322. The real object which corresponds to the real object image 320 may comprise objects such as paper, cards, business cards, or packages for example. The display 102 also shows the virtual pointer 130, virtual control buttons 132 ("Grab") and 334 ("Laser"), and virtual objects 340, 342, 344, 346, 348, and 350. The virtual control button 334 ("Laser") may be employed to activate and deactivate the virtual pointer 130 in one or more embodiments. The user may tilt the mobile device 100 such that the virtual pointer 130 points to and selects a particular virtual object. Once a virtual object has been selected, the user may activate the virtual control button 132 ("Grab") which locks the virtual object to the virtual pointer 130. A user may then tilt the mobile device, thus moving the selected virtual object, and position the virtual object at another position. The user 12 may then deactivate the virtual control button 132 ("Grab") to release the virtual object to a new location.

Figure 5:
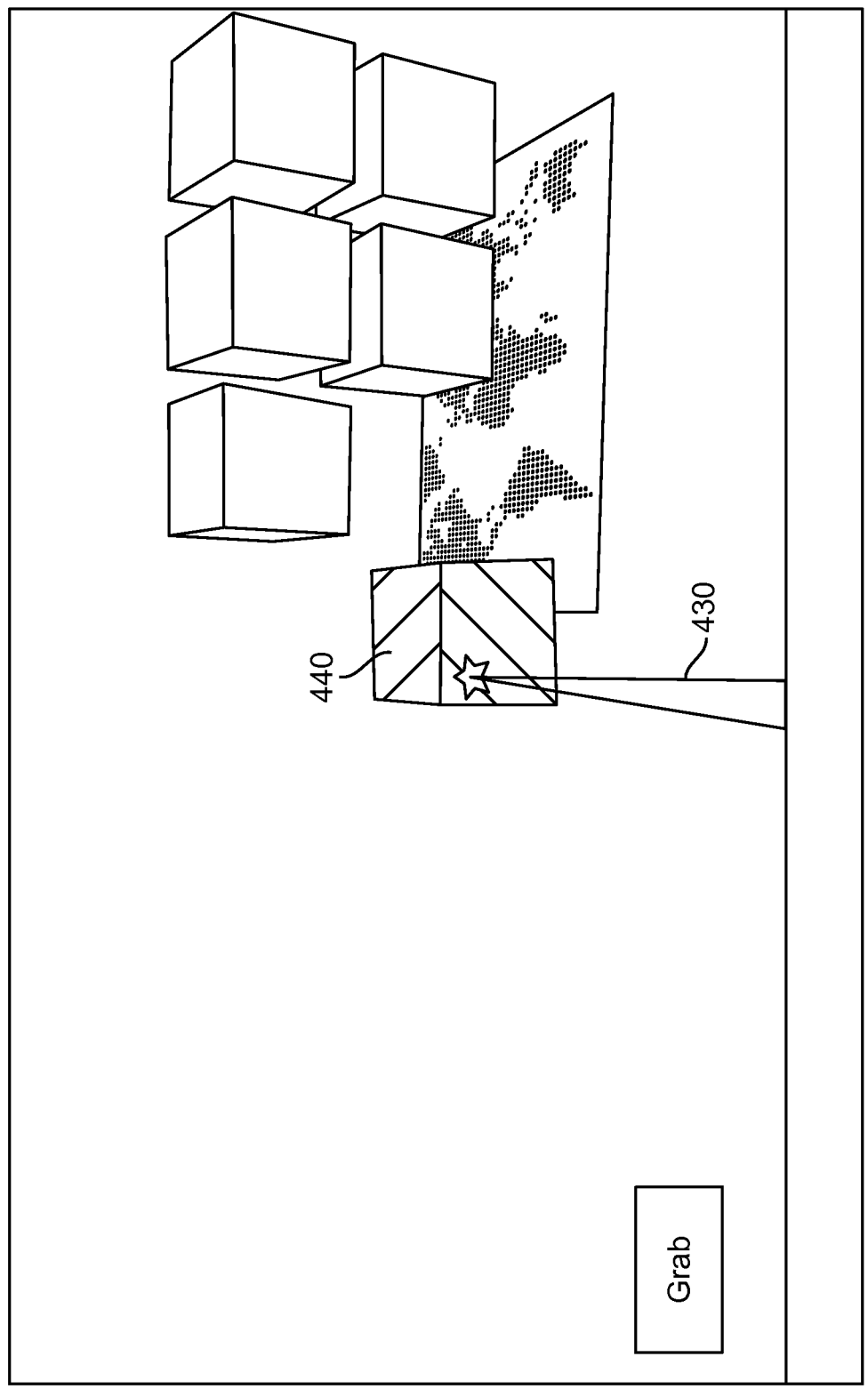
FIG. 5 is a top view of the display showing the virtual wand selecting and moving a virtual object.

FIGS. 4 and 5 further illustrate the ability of the mobile device 100 to select, hold or "grab," and move the virtual object. FIG. 4 is a view 401 of the display 102 and the touch screen 104 of a mobile device 100. The display 102 shows real object image 120 having marker images 122. The display 102 also shows the virtual wand (virtual pointer) 430, virtual control button 132 ("Grab"), and virtual objects 440, 442, 444, 446, 448, and 450. In one or more embodiments, other representations of virtual pointers 130 may include virtual lasers, virtual wands, virtual cross-hair targets, or other geometric shapes. The user 12 may tilt the mobile device 100 such that the virtual pointer 130 points to and selects a virtual object 440. In one or more embodiments, the virtual object 440 may change color or other representation form (i.e. change to wireframe display mode, becomes semi-transparent, becomes slightly inflated, becomes slightly shrunk, etc.) to indicate that the virtual pointer 430 is pointing to and selecting the virtual object 440.

Once virtual object 440 has been selected, the user may activate the virtual control button 132 ("Grab") which locks the virtual object 440 to the virtual pointer 430. As shown in FIG. 5, the user may then tilt the mobile device 100, thus moving the selected virtual object 440, and position the virtual object 440 at another location. The user 12 may then click the virtual control button 132 ("Grab") an additional time to release the virtual control object 440 to a new location.

Figure 6:
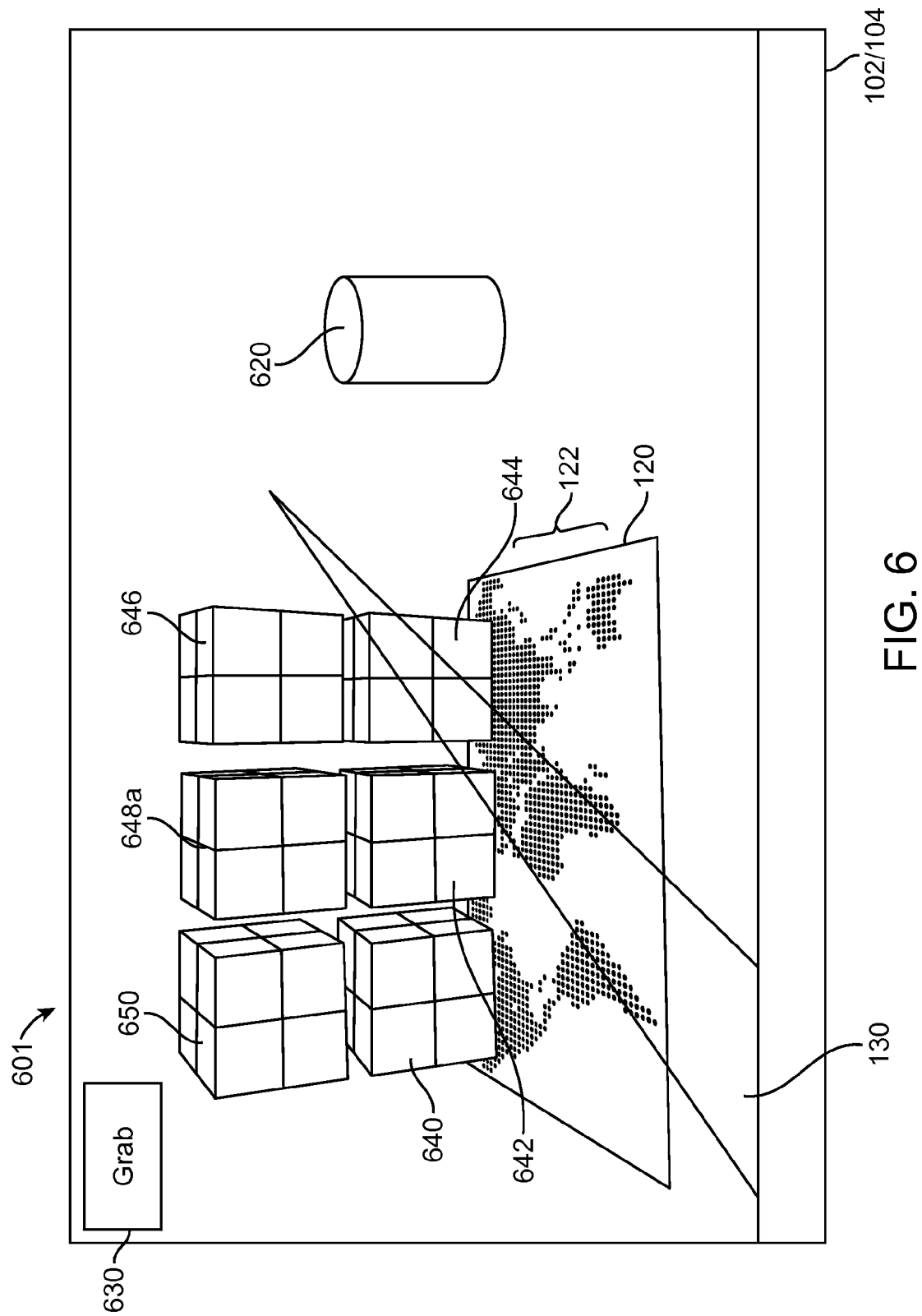
FIG. 6 is a top view of a display showing real object images, virtual objects, a virtual laser, and a virtual control button.

FIGS. 6-9 demonstrate the selection, transformation, relocation, and re-transformation of a virtual object. In one or more embodiments, transformation may be defined as moving, rotating and scaling of an object, or may be defined as changing the representation of an object FIG. 6 is a view 601 of the display 102 and the touch screen 104 of a mobile device 100. The display 102 shows real object image 120 having marker images 122, and a real object image 620 shown here as an image of a cylinder in this example. The display 102 also shows the virtual pointer 130, virtual control button 630 ("Grab"), and virtual objects 640, 642, 644, 646, 648a, and 650. The user may tilt the mobile device 100 such that the virtual pointer 130 points to and selects virtual object 648a. As a result of this selection, virtual object 648a transforms into virtual object 648b which is show here as an image of a cone. The transformation may be triggered when the virtual pointer 130 points to or selects the virtual object 648a. In an embodiment, the user may need to hold down the virtual control button 630 to trigger the transformation for the selected virtual object.

Figure 7:
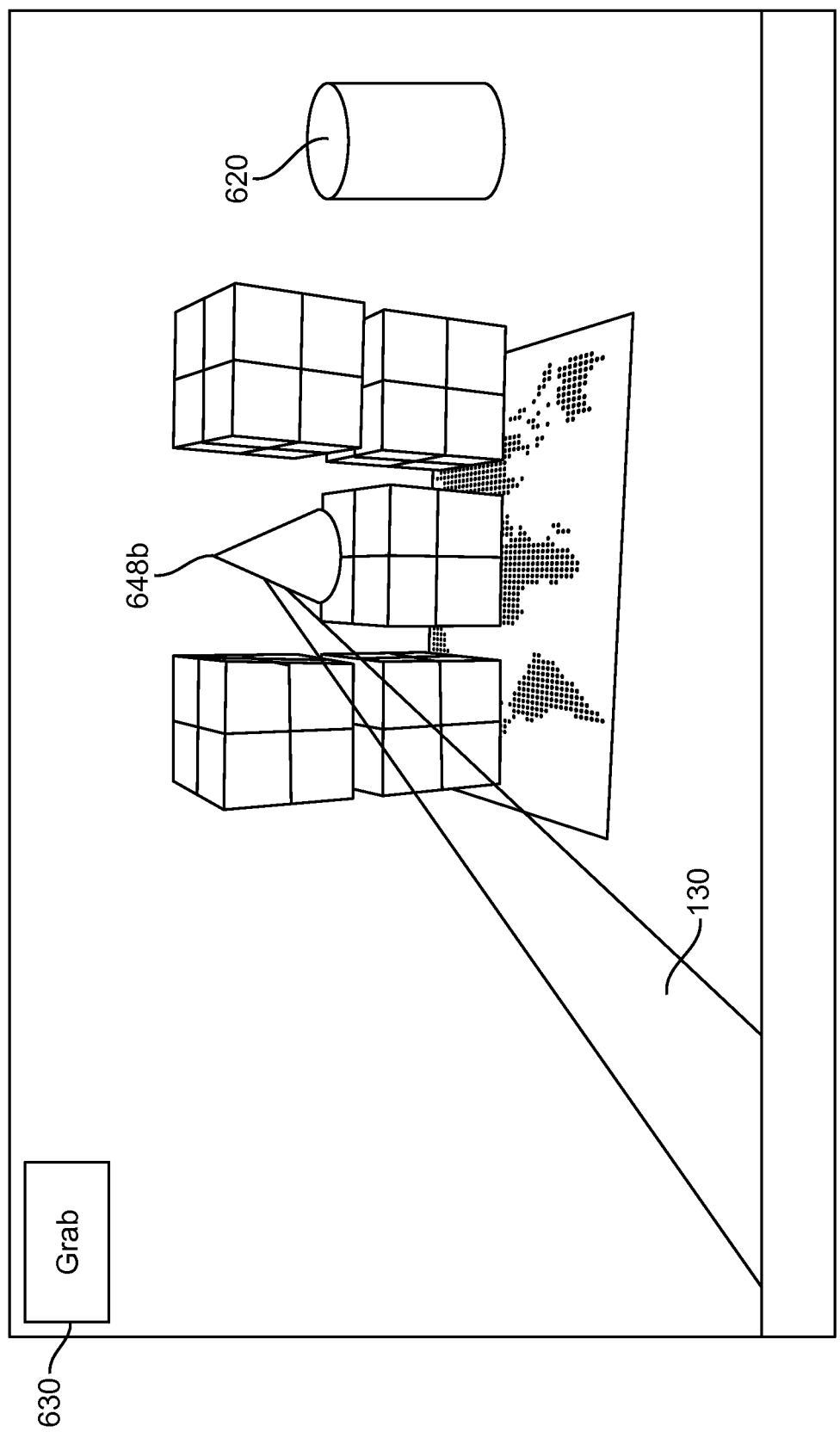
FIG. 7 is a top view of the display showing the virtual laser selecting and transforming a virtual object.

As depicted in FIG. 7, a user may then click the virtual control button 630 ("Grab") to grab virtual object 648a, which locks the virtual object 648b to virtual pointer 130.

Figure 8:
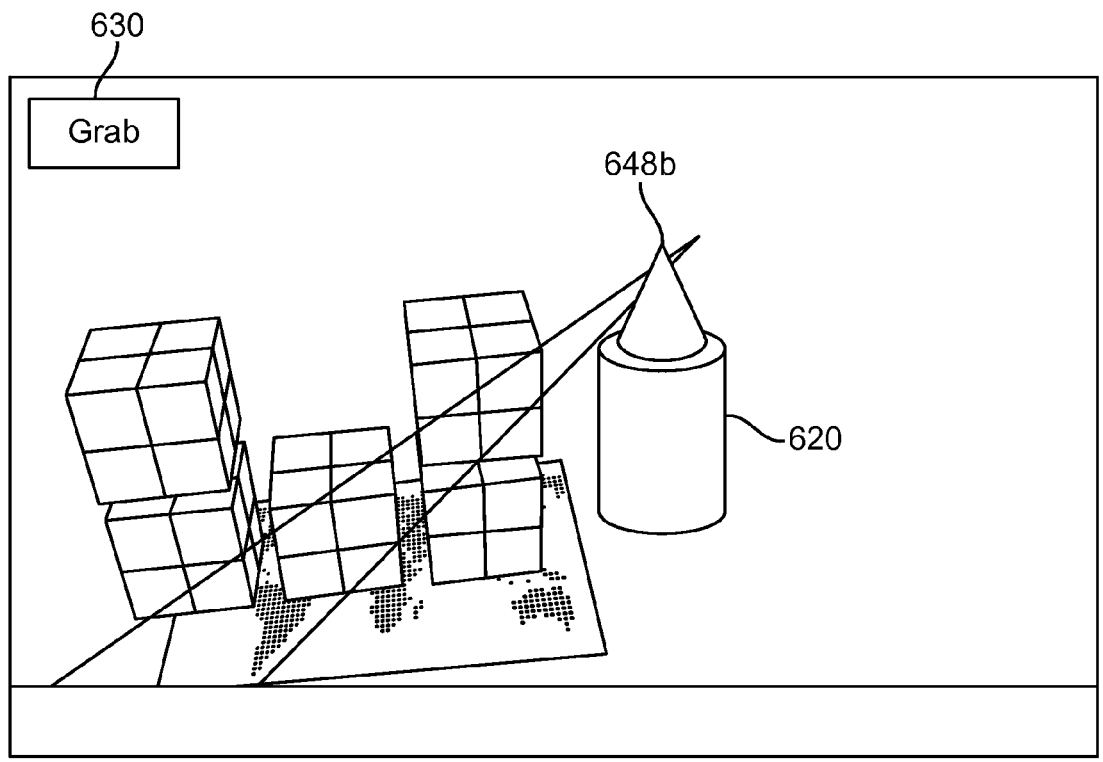
FIG. 8 is a top view of the display showing the virtual laser moving the transformed virtual object to different location.
Figure 9:
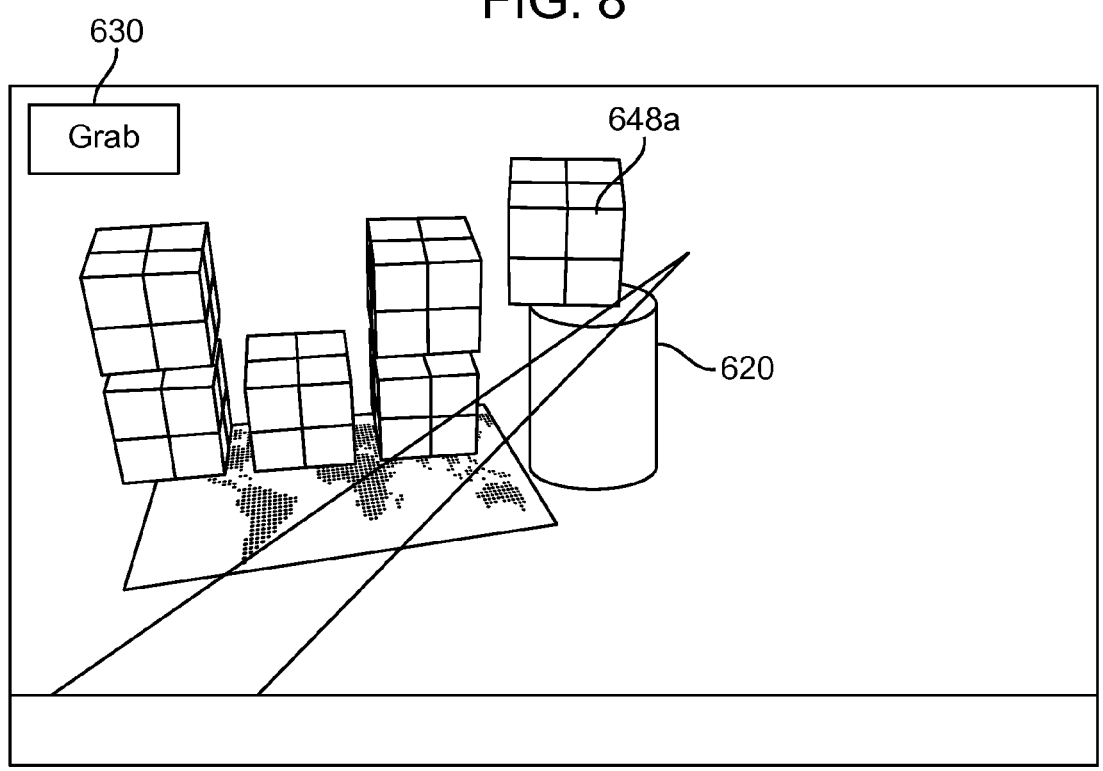
FIG. 9 is a top view of the display showing the virtual laser re-transforming the virtual object to the original form.

As shown in FIGS. 7 and 8, the user 12 may then tilt the mobile device 100, thus moving and positioning the virtual object 648b at another location immediately above the real object image 620. As sown in FIG. 9, the user may then deactivate the virtual control button 630 ("Grab") to release the virtual control object 648b to a new location. Upon laser pointer deselecting the virtual object, it re-transforms virtual object 648b (i.e. the cone) to virtual object 648a (i.e., the block).

Figure 10:
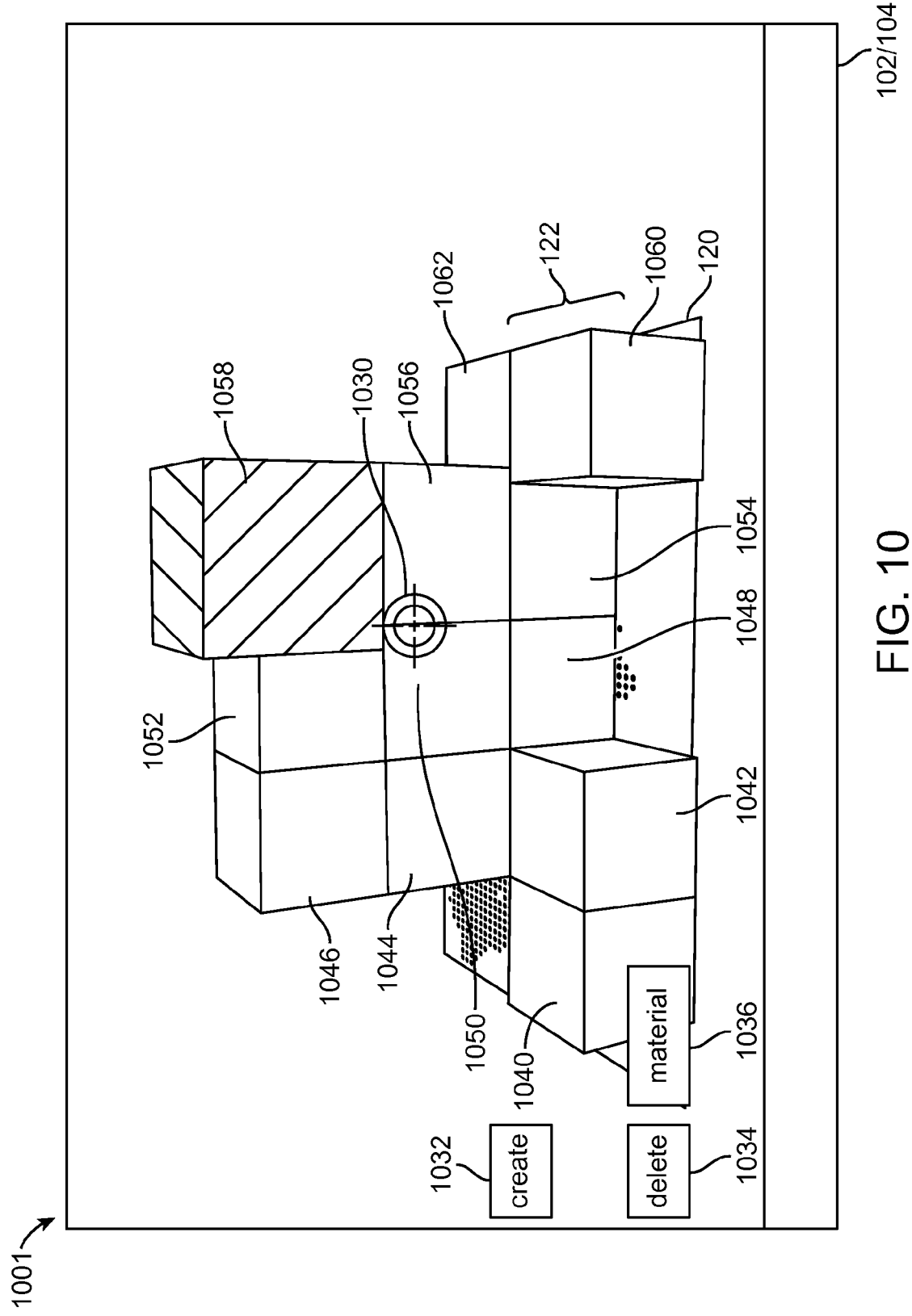
FIG. 10 is a top view of a display showing a real object image having marker images, virtual objects, a virtual cross-hair target, and virtual control buttons in an embodiment.
Figure 11:
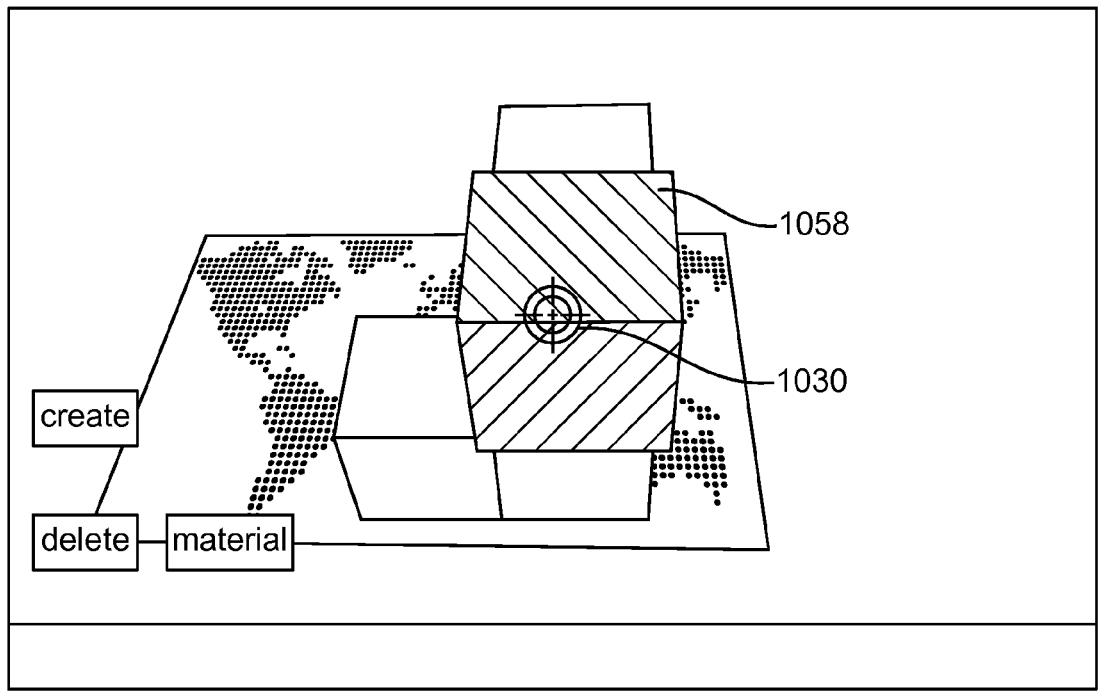
FIG. 11 is a top view of the display showing the virtual cross-hair target selecting a virtual object.
Figure 12:
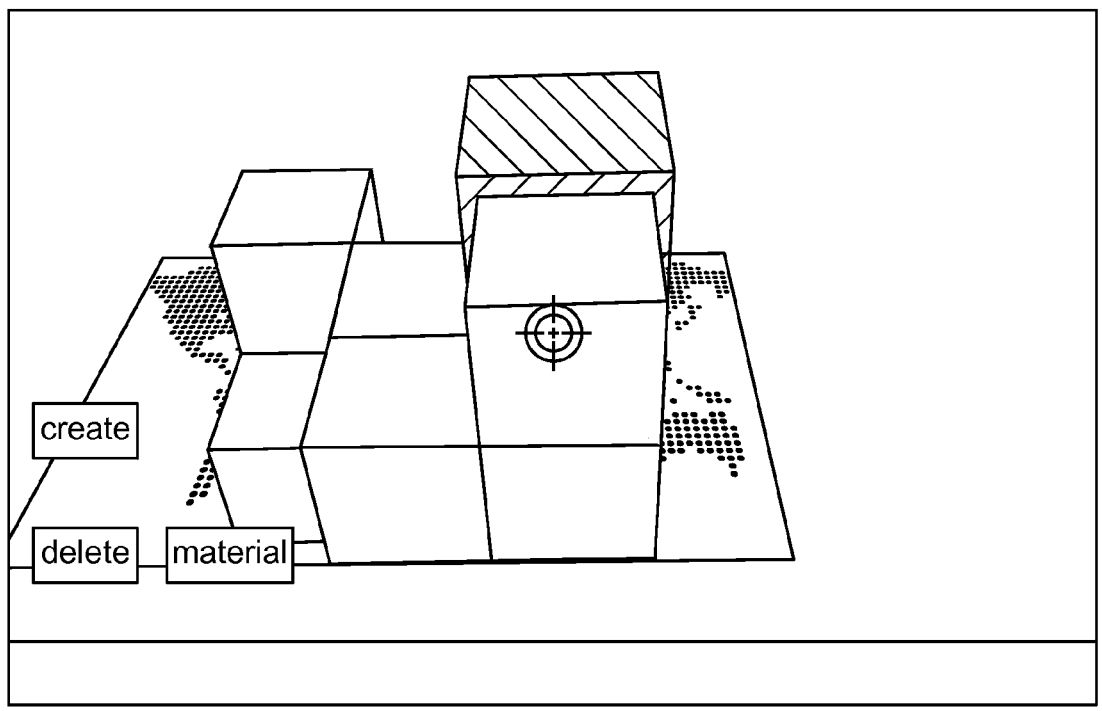
FIG. 12 is a top view of the display showing the virtual cross-hair target moving the virtual object.

FIGS. 10-12 demonstrate a building function where a user 12 may use a virtual cross-hair target to create a cube or delete a cube at the current position. The builder function may include highlighting an existing cube and changing the material for the building blocks. FIG. 10 is a view 1001 of the display 102 and the touch screen 104 of a mobile device 100. The display 102 shows real object image 120 having marker images 122. The display 102 also shows the virtual cross-hair target 1030, virtual control buttons 1032 ("create"), 1034 ("delete"), and 1036 ("material"). In one or more embodiments, virtual control button 1032 ("create") creates a new virtual object at the location of the virtual cross-hair target 1030, virtual control button 1034 ("delete") deletes the virtual object at the location of the virtual cross-hair target 1030, and virtual control button 1036 ("material") changes the composition or material of the virtual object.

The display 102 also shows virtual objects 1040, 1042, 1044, 1046, 1048, 1050, 1052, 1054, 1056, and 1058. The user may tilt the mobile device 100 such that the virtual cross-hair target 1030 points to and selects virtual object 1058. As shown in FIG. 11, when the virtual cross-hair target 1030 points to and selects virtual object 1058, virtual object 1058 may change color or become highlighted in one or more embodiments. As a result of the object being selected to the cross-hair, virtual object 1058 is locked to the virtual cross-hair target 1030. The user may then tilt the mobile device 100, thus moving the selected virtual object 1058 and positioning the virtual object 1058 at another location. In one or more embodiments, the virtual object 1058 can snap to a position when the virtual cross-hair target 1030 is within a predefined proximity to the virtual object 1058. This feature may facilitate the ease to which a user may select specific virtual objects in one or more embodiments.

In one or more embodiments, as a result of the object being selected, virtual object 1058 is locked to the virtual cross-hair target 1030. As shown in FIG. 12, the user may then tilt the mobile device 100, thus moving the selected virtual object 1058 and positioning the virtual object 1058 at another location.

Figure 13:
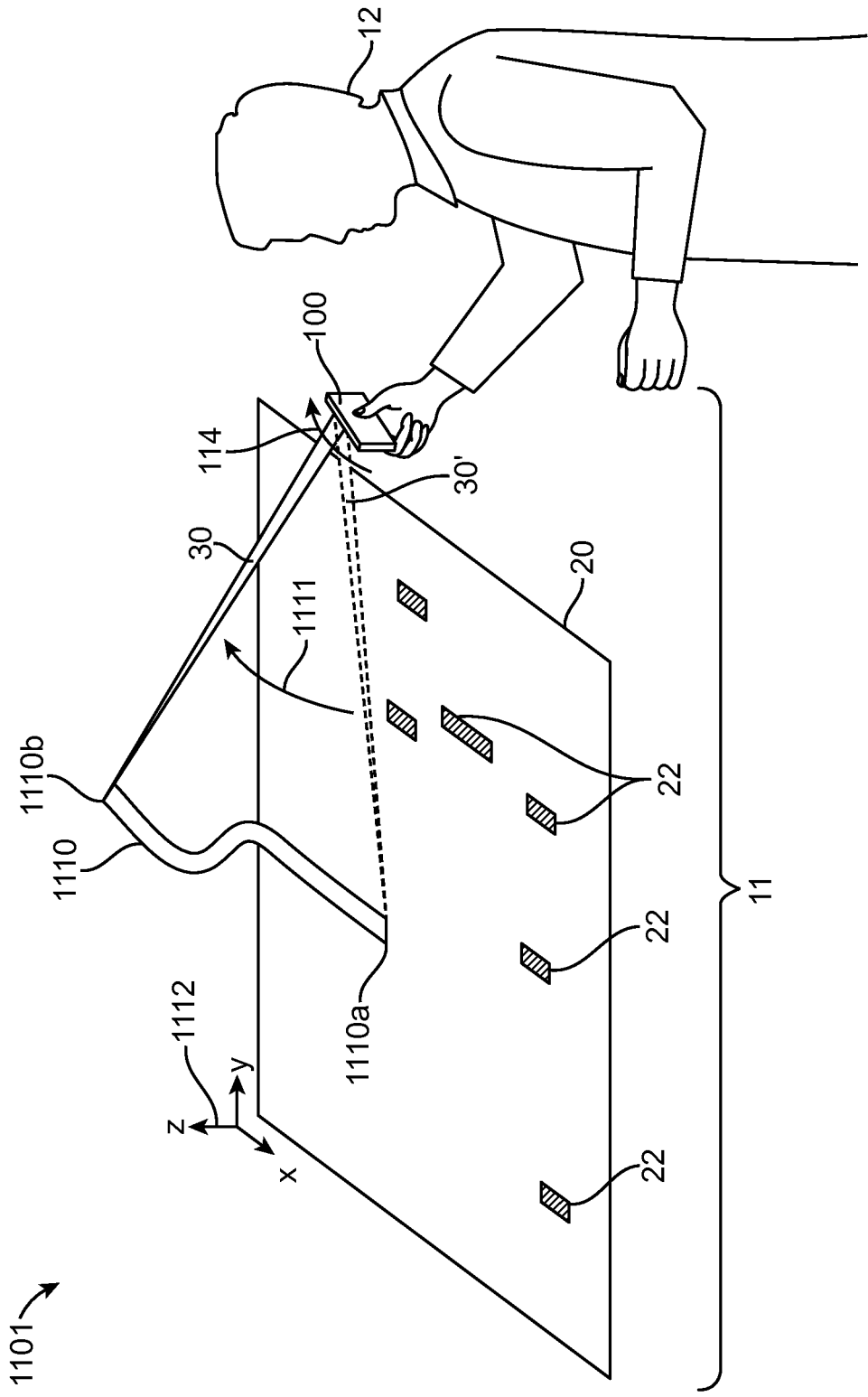
FIG. 13 is a front, perspective view of a user creating a three-dimensional curved line segment in an augmented reality environment in an embodiment.

FIG. 13 is a front, perspective view of a user 12 creating a three-dimensional curved segment 1110 in an augmented reality environment 11. The augmented reality environment comprises both real-world object images and virtual components. The real-world images include a surface image 20 having a plurality of marker images 22. The virtual components include a virtual pointer (e.g., a virtual laser) 30 symbolically emerging from the mobile device 100. The mobile device 100 detects marker images 22 or other interest points on the surface image 20, and then generates a coordinate system 1112 based on the marker images 22.

In an embodiment, a user 12 may select a first point 1110a in the augmented reality environment 11. The user 12 may then generate or draw a curved line 1110 by tilting the mobile device as indicated by the motion arrow 114 to have the virtual pointer 30 sweep across the augmented environment 11 as indicated by the motion arrow 1111. The user 12 may then release the curved line 1110 at point 1110b. In one or more embodiments, user 12 may select or release the beginning and ending points 1110a and 1110b by tapping on a virtual control button, tapping the side of the mobile device 100, or by pressing a button of the mobile device 100, or by speaking voice control commands. The line 1110 may be fine or wide, and may have a geometrically-shaped cross section.

Figure 14:
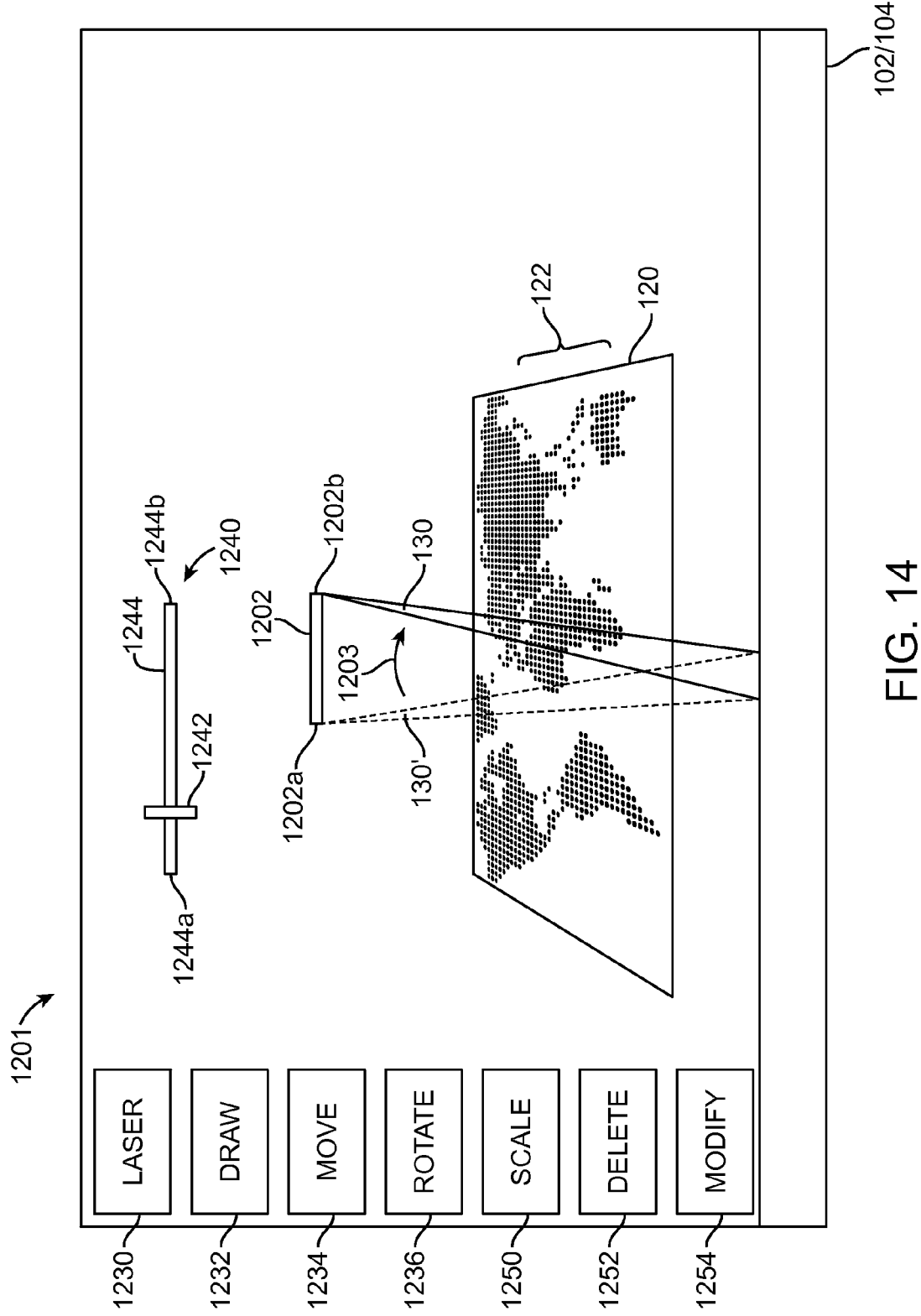
FIG. 14 is a top view of a display showing the creation of a line segment by sweeping the virtual point (i.e. moving the computer device) across the augmented reality environment.

FIG. 14 is a top view 1201 of a display showing the creation of a line segment 1202 by sweeping the virtual point across the augmented reality environment. FIG. 14 is an abstract representation of a top view of a display 102 of a mobile device 100 as seen by the user 12. In one or more embodiments, the virtual pointer 130 is fixed to a position on the display 102. In one or more embodiments, the virtual pointer 130 can move to create a line segment 1202 together with the movement of the mobile device 100 such as a phone. In one or more embodiments, the mobile device 100 moves with the laser 130 and the laser 130 does not move relative to the device 100 unless possibly in special cases. Hence, FIG. 14 is an abstract representation of the operation of the mobile device 100 and is employed to depict that motion in the physical world is translated to motion in the augmented reality environment, The display 102 has an initial virtual pointer 130' pointing at the first point 1202a, and an ending virtual pointer 130 pointing at the ending point 1202b. The display 102 also has virtual control buttons 1230 ("LASER"), 1232 ("DRAW"), 1234 ("MOVE"), and 1236 ("ROTATE"), "SCALE" "DELETE" "MODIFY". In one or more embodiments, the user 12 initiates the virtual laser 130' by clicking on virtual control button 1230 ("LASER") and aims the virtual pointer 130' to point 1202a in the augmented reality environment 11, and clicks on virtual control button 1232 ("DRAW") to begin drawing a line segment 1202 in the augmented reality environment 11. The user then moves the device, causing the virtual laser to move in the Augmented Reality environment. The line segment being drawn is displayed on the device screen inside the Augmented Reality environment. The user 12 may then cease drawing the line segment by clicking on the virtual control button 1232 ("DRAW") an additional time at point 1202b.

In one or more embodiments, the display 102 may also have a virtual slider switch 1240 having a virtual wiper 1242 which can be moved along the range 1244 from a first position 1244a to an end position 1244b. In an embodiment, the virtual slider switch 1240 may control the thickness of the line segment 1202 as the line segment 1202 is drawn. For example, the virtual wiper 1242 positioned near the first position 1244a may cause the virtual pointer 130 to generate a thin line. As the virtual wiper 1242 moves from the first position 1244a to the end position 1244b, the thickness of the line segment 1202 may increase. In one or more embodiments, versions of the slider switch 1240 may control other aspects of the augmented reality environment including the length of a virtual pointer, the direction of a virtual pointer, and/or the sizing, color or orientation of virtual objects.

Figure 15:
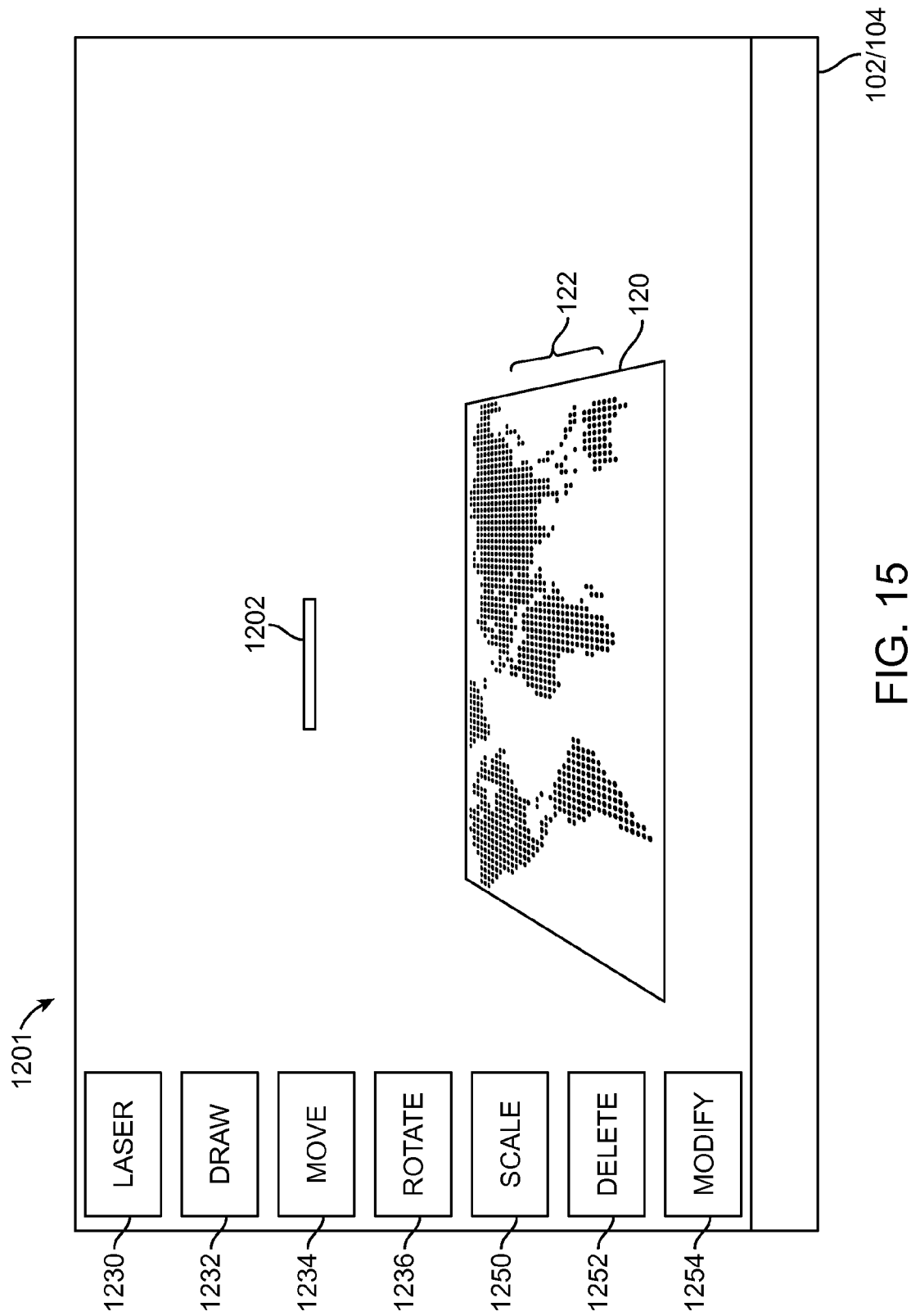
FIG. 15 is a top view of a display showing the line segment created by the user interacting with the augmented reality environment.

The virtual control buttons 1234 ("MOVE") may be employed to select and move the entire line segment 1202, and 1236 ("ROTATE") may be used to rotate the entire line segment 1202 in an embodiment, and 1250 ("SCALE") may be used to scale the entire line segment 1202 in an embodiment, and 1252 ("DELETE") may be used to delete the entire line segment 1202 in an embodiment, and 1254 ("MODIFY") may be used to modify certain properties of the entire line segment 1202 in an embodiment (such as thickness, color, transparency, position, rotation, scale, etc.). Virtual control buttons having other functionality are contemplated in one or more embodiments. As depicted in FIG. 15, the user 12 may then click on virtual control button 1230 ("LASER") an additional time to deactivate the virtual laser 130.

Figure 16:
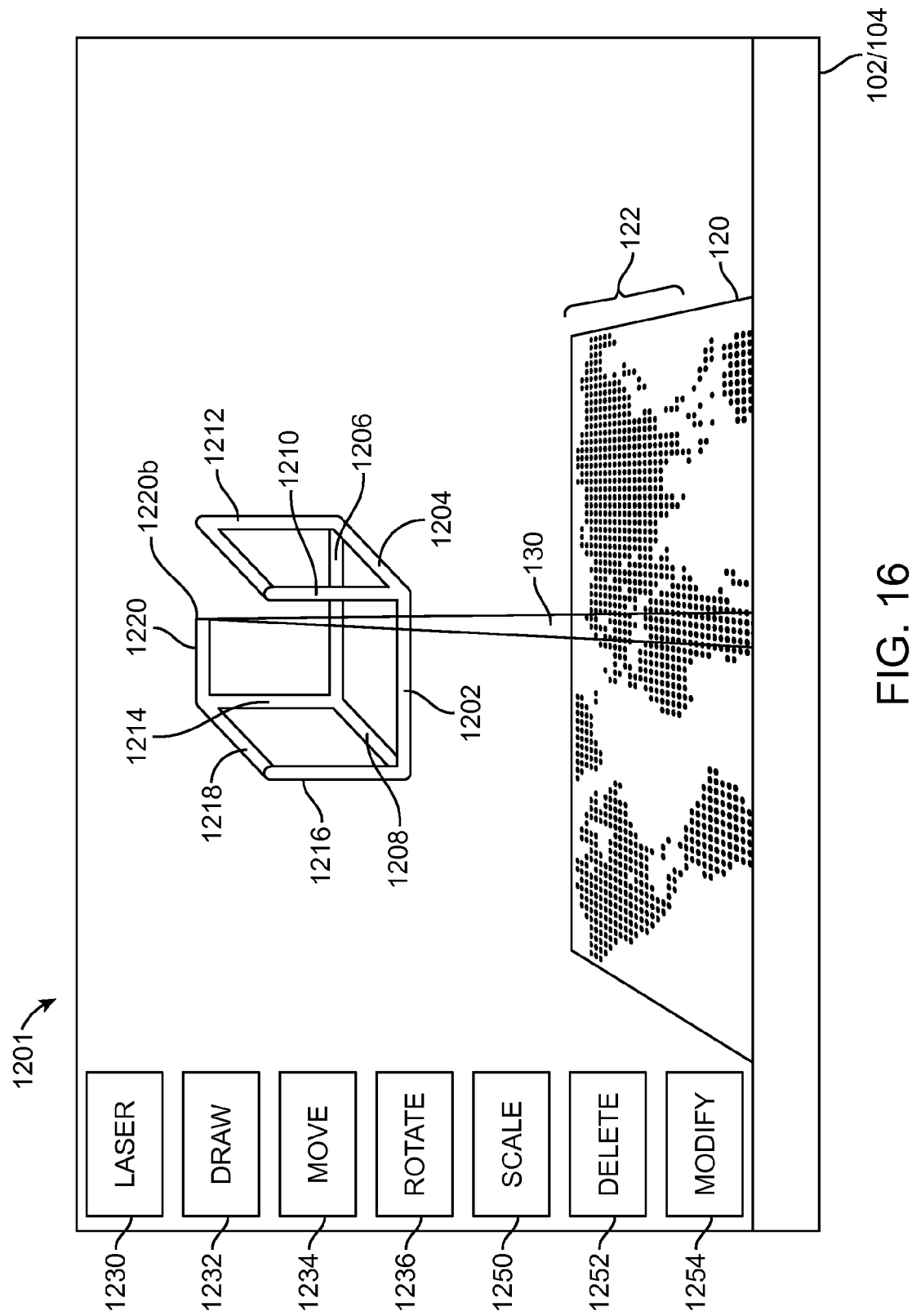
FIG. 16 is a top view of a display showing the user continues to draw a plurality of segments inside the augmented reality environment.

FIG. 16 is a top view of a display 102 showing the user 12 drawing a plurality of segments forming a cube. Employing the virtual control buttons 1230 ("LASER") and 1232 ("DRAW"), the user 12 may then create additional line segments 1204, 1206, 1208, 1210, 1212, 1214, 1216, 1218, and 1220 as described above in one or more embodiments. As depicted, virtual pointer 130 is drawing line segment 1220 having a current end point 1220b. In one or more embodiments, each line segment may attach to other line segments to form a geometric object such as a cube in one or more embodiments. Note that from the perspective of the user, in order to draw line segment 1220 which is in further back compared to line segment 1202, the user must physically move the device closer to the marker image 120/122. As a result, the tip of the laser pointer indeed reaches further back in the Augmented Reality environment.

Figure 17:
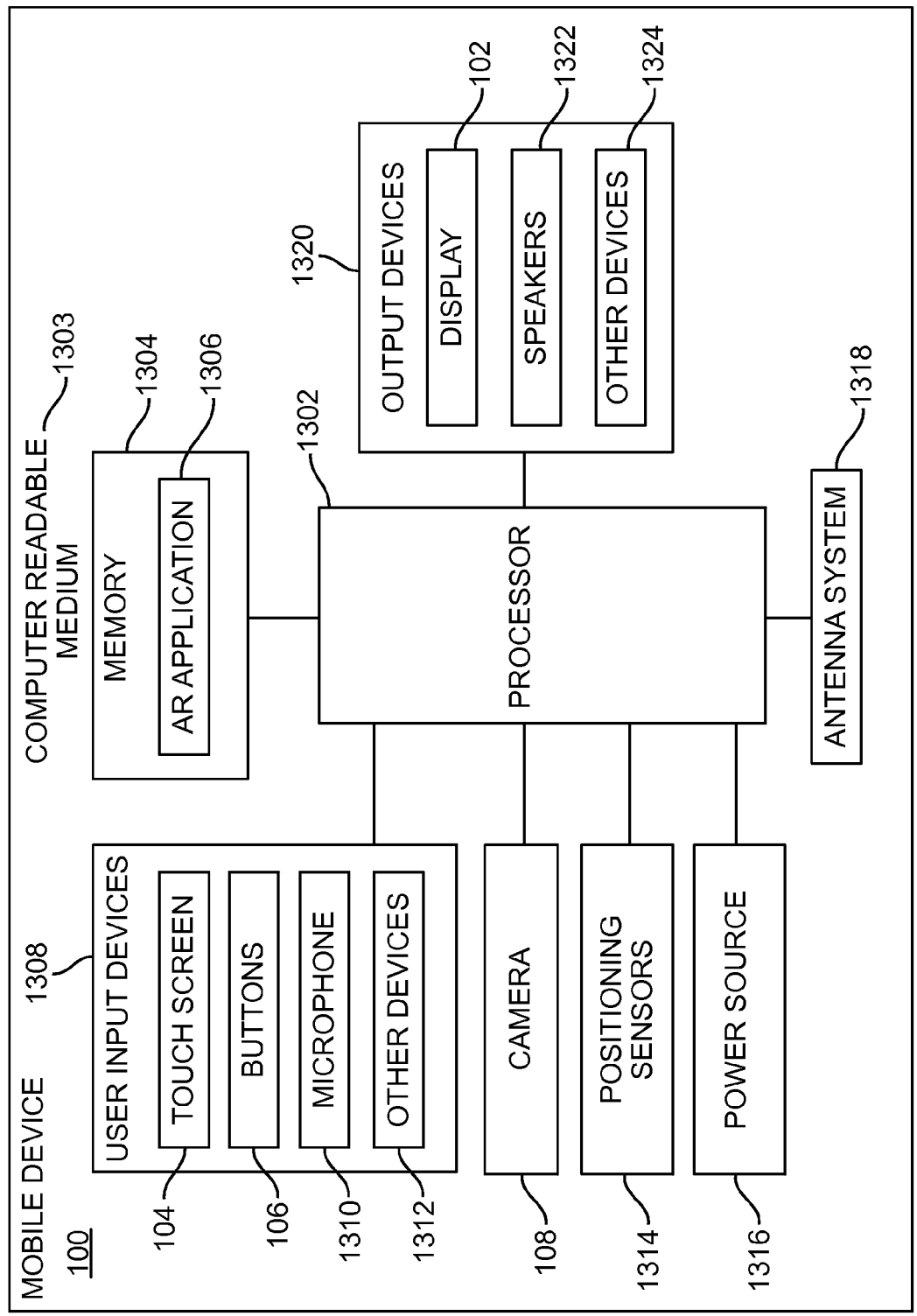
FIG. 17 is a schematic, block diagram of a mobile device in an embodiment.

FIG. 17 shows an embodiment of a mobile device 100. The mobile device has a processor 1302 which controls the mobile device 100. The various devices in the mobile device 100 may be coupled by one or more communication buses or signal lines. The processor 1302 may be general purpose computing device such as a controller or microprocessor for example. In an embodiment, the processor 1302 may be a special purpose computing device such as an Application Specific Integrated Circuit ("ASIC"), a Digital Signal Processor ("DSP"), or a Field Programmable Gate Array ("FPGA"). The mobile device 100 has a memory 1304 which communicates with processor 1302. The memory 1304 may have one or more applications such as the Augmented Reality ("AR") application 1306. The memory 1304 may reside in a computer or machine readable non-transitory medium 1303 which, when executed, cause a data processing system or processor 1302 to perform methods described herein.

The mobile device 100 has a set of user input devices 1308 coupled to the processor 1302, such as a touch screen 104, one or more buttons 106, a microphone 1310, and other devices 1312 such as keypads, touch pads, pointing devices, accelerometers, gyroscopes, magnetometers, vibration motors for haptic feedback, or other user input devices coupled to the processor 1302, as well as other input devices such as USB ports, Bluetooth modules, WIFI modules, infrared ports, pointer devices, or thumb wheel devices. The touch screen 104 and a touch screen controller may detect contact, break, or movement using touch screen technologies such as infrared, resistive, capacitive, surface acoustic wave technologies, as well as proximity sensor arrays for determining points of contact with the touch screen 104. Reference is made herein to users interacting with mobile devices such as through displays, touch screens, buttons, or tapping of the side of the mobile devices as non-limiting examples. Other devices for a user to interact with a computing device include microphones for accepting voice commands, a rear-facing or front-facing camera for recognizing facial expressions or actions of the user, accelerometers, gyroscopes, magnetometers and/or other devices for detecting motions of the device, and annunciating speakers for tone or sound generation are contemplated in one or more embodiments.

The mobile device 100 may also have a camera 108, depth camera, positioning sensors 1314, and a power source 1316. The positioning sensors 1314 may include GPS sensors or proximity sensors for example. The power source 1316 may be a battery such as a rechargeable or non-rechargeable nickel metal hydride or lithium battery for example. The processor 1302 may be coupled to an antenna system 1318 configured to transmit or receive voice, digital signals, and media signals.

The mobile device 100 may also have output devices 1320 coupled to the processor 1302. The output devices 1320 may include a display 102, one or more speakers 1322, vibration motors for haptic feedback, and other output devices 1324. The display 102 may be an LCD display device, or OLED display device. The mobile device may be in the form of hand-held, or head-mounted.

Although the invention has been discussed with reference to specific embodiments, it is apparent and should be understood that the concept can be otherwise embodied to achieve the advantages discussed. The preferred embodiments above have been described primarily as virtual pointers for interacting with an augmented reality. In this regard, the foregoing description of the virtual pointers is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

Unless specifically stated otherwise, it shall be understood that disclosure employing the terms "processing," "computing," "determining," "calculating," "receiving images," "acquiring," "generating," "performing" and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor 1302 and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object oriented technologies, interpreted or compiled languages, and can be a module, component, or function. Computer programs may be executed in one or more processors or computer systems.

In one or more embodiments, a machine implemented method for interacting with objects in an augmented reality environment is contemplated. The method comprises receiving real-time data stream (video, depth, etc.) of a reality-based environment with a computing device through various sensors (camera, depth sensor, etc.), the computing device identifies track-able objects within the data stream (single track-able marker or multiple track-able markers, and/or track-able physical objects), and calculates the 6 degrees of freedom (DOFs) positional and rotational information of the device. The computing device has a display capable of providing a real-time view of the reality-based environment via acquired real-time data stream (video, depth, etc.), generating an augmented reality environment having one or more virtual objects combined with the reality-based environment. The method further comprises generating a virtual pointer in the augmented reality environment on the display of the device, and the virtual pointer allows selecting virtual object(s) and/or a region of the augmented reality environment, and performing an action for the selected region.

Performing an action for the selected region preferably further comprises identifying a virtual object associated with the selected region, and removing the virtual object associated with the selected region. Performing an action for the selected region preferably further comprises generating a line or shape which corresponds to the path swept by the virtual pointer. The virtual pointer is preferably a virtual laser. The virtual pointer is preferably a virtual wand in various shapes and sizes.

In one or more embodiments, a machine readable non-transitory medium storing executable program instructions which when executed cause a data processing system to perform a method is contemplated. The method comprises receiving real-time data stream (video, depth, etc.) of a reality-based environment with a computing device through various sensors (camera, depth sensor, etc.), the computing device identifies track-able objects within the data stream (single track-able marker or multiple track-able markers, and/or track-able physical objects), and calculates the 6 degrees of freedom (DOFs) positional and rotational information of the device. The computing device has a display capable of providing a real-time view of the reality-based environment via acquired real-time data stream (video, depth, etc.), generating an augmented reality environment having one or more virtual objects combined with the reality-based environment. The method further comprises generating a virtual pointer in the augmented reality environment on the display of the device, and the virtual pointer allows selecting virtual object(s) and/or a region of the augmented reality environment, and performing an action for the selected region.

In one or more embodiments, a device is contemplated. The device comprises an input panel configured to receive user input, and at least one processing system coupled to the input panel. The at least one processing system having one or more processors configured to generate and interact with an augmented reality environment based on at least the user input. The at least one processing system operable to perform the operations including receiving real-time data stream (video, depth, etc.) of a reality-based environment with a computing device through various sensors (camera, depth sensor, etc.), the computing device identifies track-able objects within the data stream (single track-able marker or multiple track-able markers, and/or track-able physical objects), and calculates the 6 degrees of freedom (DOFs) positional and rotational information of the device. The at least one processing system has a display capable of providing a real-time view of the reality-based environment via acquired real-time data stream (video, depth, etc.). The at least one processing system further comprises generating an augmented reality environment having one or more virtual objects combined with the reality-based environment. The at least one processing system further comprises generating a virtual pointer in the augmented reality environment on the display of the device, and the virtual pointer allows selecting virtual object(s) and/or a region of the augmented reality environment, and performing an action for the selected region.

What is claimed is:

1. A machine implemented method for interacting with images in an augmented reality environment, comprising:
   receiving images of a reality-based environment with a computing device, the computing device having a display capable of providing a real-time view of the reality-based environment;
   acquiring an image of a real object;
   identifying one or more markers on the real object image by the computing device;
   generating an augmented reality environment having one or more virtual objects combined with the reality-based environment;
   generating a virtual pointer in the augmented reality environment on the display of the device, wherein from a perspective of a user looking into the augmented reality environment, the virtual pointer points out of a back of the display into the reality-based environment;
   selecting a region of the augmented reality environment with the virtual pointer; and,
   performing an action for the selected region.

2. The machine implemented method for interacting with images in an augmented reality environment of claim 1, wherein performing an action for the selected region further comprises:
   identifying a virtual object associated with the selected region; and, selecting the virtual object associated with the selected region.

3. The machine implemented method for interacting with images in an augmented reality environment of claim 2, wherein the performing an action for the selected region further comprises moving the virtual object from a first location to a second location in the augmented reality environment.

4. The machine implemented method for interacting with images in an augmented reality environment of claim 1, wherein performing an action for the selected region further comprises:
  selecting a first point in the augmented reality environment by the virtual pointer;
  moving the virtual pointer to a second point in the augmented reality environment; and
  generating a visible line connecting the first point and the second point in the augmented reality environment;
  creating an additional virtual object controllable by the user based on the visible line connecting the first point and the second point; and
  locating the created additional virtual object at or near the selected region.

5. The machine implemented method for interacting with images in an augmented reality environment of claim 1, wherein performing an action for the selected region further comprises:
  selecting a first point associated with the selected region, wherein the first point is at the end of the virtual pointer;
  sweeping the end of the virtual pointer across an area to a second point at the end of the virtual pointer, wherein the area between the first point and the second point define a user selectable portion of the selected region.

6. The machine implemented method for interacting with images in an augmented reality environment of claim 5, wherein performing an action for the selected region further comprises generating a visible line which corresponds to the path swept by the end of the virtual pointer between the first point and the second point.

7. The machine implemented method for interacting with images in an augmented reality environment of claim 1, wherein the virtual pointer is a virtual laser.

8. The machine implemented method for interacting with images in an augmented reality environment of claim 1, wherein the virtual pointer is a virtual wand.

9. The machine implemented method for interacting with images in an augmented reality environment of claim 1, wherein the selecting a region of the augmented reality environment with the virtual pointer further comprising:
  pointing the virtual pointer to the region in the augmented reality environment;
  receiving vibrations resulting from a user tapping on the side of the computing device; and,
  selecting the region of the augmented reality environment.

10. The machine implemented method for interacting with images in an augmented reality environment of claim 1, wherein selecting a region of the augmented reality environment further comprises:
  identifying a first virtual object associated with the selected region;
  selecting the first virtual object associated with the selected region;
  identifying a second virtual object associated with the selected region;
  selecting the second virtual object associated with the selected region;
  forming a group of virtual objects comprising the first and the second virtual objects; and,
  manipulating the group of virtual objects, wherein the first virtual object is manipulated simultaneously with the second virtual object.

11. A machine readable non-transitory medium storing executable program instructions which when executed cause a data processing system to perform a method comprising:
  receiving images of a reality-based environment with a computing device, the computing device having a display capable of providing a real-time view of the reality-based environment;
  acquiring an image of a real object in the reality-based environment;
  identifying one or more markers on the real object image by the computing device;
  generating an augmented reality environment having one or more virtual objects combined with the image of the real object in the reality-based environment;
  generating a virtual pointer in the augmented reality environment within the display of the device;
  moving the virtual pointer between the image of the real object and the one or more virtual objects within the augmented reality environment relative to a movement of the display of the device by a user;
  selecting a region of the augmented reality environment with the virtual pointer; and,
  performing an action for the selected region.

12. The machine readable non-transitory medium storing executable program instructions which when executed cause the data processing system to perform the method of claim 11, wherein performing an action for the selected region further comprises:
  identifying a virtual object associated with the selected region; and, selecting the virtual object associated with the selected region.

13. The machine readable non-transitory medium storing executable program instructions which when executed cause the data processing system to perform the method of claim 12, wherein the performing an action for the selected region further comprises moving the virtual object from a first location to a second location in the augmented reality environment.

14. The machine readable non-transitory medium storing executable program instructions which when executed cause the data processing system to perform the method of claim 11, wherein performing an action for the selected region further comprises creating an additional virtual object and locating the created additional virtual object at or near the selected region.

15. The machine readable non-transitory medium storing executable program instructions which when executed cause the data processing system to perform the method of claim 11, wherein performing an action for the selected region further comprises:
  identifying a point in the selected region with the virtual pointer;
  providing a function to create a virtual object at the identified point;
  providing a function to change attributes of the created virtual function and,
  providing a function to delete the created virtual object.

16. The machine readable non-transitory medium storing executable program instructions which when executed cause the data processing system to perform the method of claim 11, wherein performing an action for the selected region further comprises generating a line which corresponds to the path swept by the virtual pointer.

17. The machine readable non-transitory medium storing executable program instructions which when executed cause the data processing system to perform the method of claim 11, wherein the virtual pointer is a virtual laser.

18. The machine readable non-transitory medium storing executable program instructions which when executed cause the data processing system to perform the method of claim 11, wherein the virtual pointer is a virtual wand.

19. The machine readable non-transitory medium storing executable program instructions which when executed cause the data processing system to perform the method of claim 11, wherein the selecting a region of the augmented reality environment with the virtual pointer further comprising:
  pointing the virtual pointer to the region in the augmented reality environment;
  receiving vibrations resulting from a user tapping on the side of the computing device; and,
  selecting the region of the augmented reality environment.

20. The machine readable non-transitory medium storing executable program instructions which when executed cause the data processing system to perform the method of claim 11, wherein selecting a region of the augmented reality environment further comprises:
  identifying a first virtual object associated with the selected region;
  selecting the first virtual object associated with the selected region;
  identifying a second virtual object associated with the selected region;
  selecting the second virtual object associated with the selected region;
  forming a group of virtual objects comprising the first and the second virtual objects; and,
  manipulating the group of virtual objects, wherein the first virtual object is manipulated the same as that of the second virtual object.

21. A computing device comprising:
  an input panel configured to receive user input;
  at least one processing system coupled to the input panel, the at least one processing system having one or more processors configured to generate and interact with an augmented reality environment based on at least the user input, the at least one processing system operable to perform the operations including:
  receiving images of a reality-based environment with a computing device,
  the computing device having a display capable of providing a real-time view of the reality-based environment;
  acquiring an image of a real object;
  identifying one or more markers on the real object image by the computing device;
  generating an augmented reality environment having one or more virtual objects combined with the reality-based environment;
  generating a virtual pointer in the augmented reality environment on the display of the device, wherein the virtual pointer, from a user's perspective, points out of a back of the display into the reality-based environment of the augmented reality environment;
  moving the virtual pointer within the reality-based environment relative to a movement of the device in the reality-based environment by the user;
  selecting a region of the augmented reality environment with the movement of the virtual pointer; and,
  performing an action for the selected region.

22. The device of claim 21, wherein the at least processing system is further operable to perform the operations comprising:
  identifying a virtual object associated with the selected region;
  selecting the virtual object associated with the selected region.

23. The device of claim 21, wherein the performing an action for the selected region further comprises moving the virtual object from a first location to a second location in the augmented reality environment.

24. The device of claim 21, wherein performing an action for the selected region further comprises creating an additional virtual object and locating the created additional virtual object at or near the selected region.

25. The device of claim 21 wherein the selecting a region of the augmented reality environment with the virtual pointer further comprising:
  pointing the virtual pointer to the region in the augmented reality environment;
  receiving vibrations resulting from a user tapping on the side of the computing device; and,
  selecting the region of the augmented reality environment.

26. The device of claim 21, wherein selecting a region of the augmented reality environment further comprises:
  identifying a first virtual object associated with the selected region;
  selecting the first virtual object associated with the selected region;
  identifying a second virtual object associated with the selected region;
  selecting the second virtual object associated with the selected region;
  forming a group of virtual objects comprising the first and the second virtual objects; and,
  manipulating the group of virtual objects, wherein the first virtual object is manipulated the same as that of the second virtual object.

* * * * *